US012214414B2

(12) United States Patent
Debus et al.

(10) Patent No.: US 12,214,414 B2
(45) Date of Patent: Feb. 4, 2025

(54) LINEAR-ACTUATED PRESS MACHINE HAVING MULTIPLE MOTORS AND CLUTCH SYSTEM FOR MULTI-SPEED DRIVE FUNCTIONALITY

(71) Applicant: PDInnovative LLC, Fenton, MO (US)

(72) Inventors: Jeffrey E. Debus, Ballwin, MO (US); Darrell B. Harrelson, St Peters, MO (US)

(73) Assignee: PDInnovative LLC, Fenton, MO (US)

( * ) Notice: Subject to any disclaimer, the term of this patent is extended or adjusted under 35 U.S.C. 154(b) by 0 days.

(21) Appl. No.: 18/505,612

(22) Filed: Nov. 9, 2023

(65) Prior Publication Data

US 2024/0075518 A1 Mar. 7, 2024

Related U.S. Application Data

(63) Continuation of application No. 17/933,741, filed on Sep. 20, 2022, now Pat. No. 11,819,906, which is a (Continued)

(51) Int. Cl.

*B30B 1/18* (2006.01)
*B21J 9/02* (2006.01)
*B30B 15/12* (2006.01)

(52) U.S. Cl.

CPC .................. *B21J 9/02* (2013.01); *B30B 1/18* (2013.01); *B30B 15/12* (2013.01)

(58) Field of Classification Search

CPC .......... B30B 11/04; B30B 1/18; B30B 1/183; B30B 1/188

See application file for complete search history.

(56) References Cited

U.S. PATENT DOCUMENTS 5,488,880 A 2/1996 Sartorio
6,189,444 B1 * 2/2001 Babiel ...................... B30B 1/18 184/6.14

(Continued)

FOREIGN PATENT DOCUMENTS

EP 0929396 B1 7/2000
EP 1894708 A1 3/2008

(Continued)

OTHER PUBLICATIONS

International Search Report and Written Opinion of International Searching Authority for International Patent Application No. PCT/US2022/044092, mailed Mar. 8, 2023 (38 pages).

(Continued)

*Primary Examiner* — Matthew Katcoff
(74) *Attorney, Agent, or Firm* — Nixon Peabody LLP

(57) ABSTRACT

A press machine comprises a moveable press ram, an actuator, a first motor system, a second motor system, and a belt system. The moveable press ram holds a tool that forms a part. The actuator linearly moves the moveable press ram by use of a male-female thread mechanism. The actuator includes an actuator sprocket coupled to the male-female thread mechanism. The first motor system produces a high-force linear movement condition to the press ram, and includes a clutch coupled to a first motor and a first motor sprocket coupled to the clutch. The second motor system produces a high-speed linear movement condition to the press ram. The belt system couples the actuator sprocket, the first motor sprocket, and the second motor sprocket. The clutch allows the first motor to partially or fully disengage from rotational movement of the first sprocket when the belt is being driven by the second motor.

20 Claims, 27 Drawing Sheets

Related U.S. Application Data continuation-in-part of application No. 17/806,268, filed on Jun. 9, 2022, now Pat. No. 11,541,618.

(60) Provisional application No. 63/261,453, filed on Sep. 21, 2021, provisional application No. 63/263,603, filed on Nov. 5, 2021.

(56) References Cited

U.S. PATENT DOCUMENTS

| | | | | |
|---|---|---|---|---|
| 6,193,625 | B1 | 2/2001 | Ullrich | |
| 6,640,601 | B2 | 11/2003 | Hatty | |
| 7,284,407 | B2 | 10/2007 | Imaeda | |
| 7,357,073 | B2 | 4/2008 | Aoshima | |
| 7,413,029 | B2 | 8/2008 | Seno | |
| 7,574,891 | B2 | 8/2009 | Futamura | |
| 7,752,880 | B2 | 7/2010 | Sakamoto | |
| 7,880,345 | B2 | 2/2011 | Hoffmann | |
| 7,997,190 | B2 | 8/2011 | Patton | |
| 8,220,384 | B2 | 7/2012 | Bosga | |
| 8,715,132 | B2 | 5/2014 | Kopecek | |
| 8,727,931 | B2 | 5/2014 | Hafner | |
| 8,739,595 | B2 | 6/2014 | Hafner | |
| 8,823,229 | B2 * | 9/2014 | Brieschke | F16H 19/025 310/90 |
| 10,024,405 | B2 | 7/2018 | Emmons | |
| 10,228,046 | B2 | 3/2019 | Parmar | |
| 10,279,556 | B2 | 5/2019 | Imaeda | |
| 10,696,000 | B2 | 6/2020 | Kosse | |
| 10,828,858 | B2 | 11/2020 | Gontkosky | |
| 10,919,248 | B2 | 2/2021 | Hattori | |
| 10,927,933 | B2 | 2/2021 | Emmons | |
| 10,962,090 | B2 | 3/2021 | Hafner | |
| 2004/0170718 | A1 | 9/2004 | Futamura | |
| 2005/0204798 | A1 | 9/2005 | Imaeda | |
| 2006/0249038 | A1 | 9/2006 | Futamura | |
| 2009/0071351 | A1 | 3/2009 | Patton | |
| 2009/0247346 | A1 | 10/2009 | Hvolka | |
| 2009/0260463 | A1 | 10/2009 | Fukano | |
| 2010/0050796 | A1 | 3/2010 | Eschborn | |
| 2010/0206187 | A1 | 8/2010 | Hafner | |
| 2013/0012349 | A1 | 1/2013 | Hafner | |
| 2013/0074710 | A1 | 3/2013 | Kuboe | |
| 2014/0202345 | A1 | 7/2014 | Wood | |
| 2016/0243778 | A1 | 8/2016 | Imaeda | |
| 2016/0273620 | A1 | 9/2016 | Hafner | |
| 2019/0255791 | A1 | 8/2019 | Hattori | |
| 2020/0147915 | A1 | 5/2020 | Mayer | |
| 2020/0215778 | A1 | 7/2020 | Chiu | |
| 2021/0231198 | A1 | 7/2021 | Emmons | |

FOREIGN PATENT DOCUMENTS

| | | | |
|---|---|---|---|
| EP | 2375102 | A1 | 10/2011 |
| EP | 2432671 | A2 | 3/2012 |
| EP | 1570979 | B1 | 2/2013 |
| EP | 3065945 | B1 | 7/2019 |
| EP | 2158074 | B1 | 4/2020 |
| EP | 3286456 | B1 | 6/2020 |
| EP | 3552956 | B1 | 10/2020 |
| EP | 3752731 | A1 | 12/2020 |
| EP | 3093529 | B1 | 8/2021 |
| JP | S 60247496 | A | 12/1985 |
| JP | H 04243723 | A | 8/1992 |
| JP | H 04117718 | U | 10/1992 |
| JP | H 11221700 | A | 8/1999 |
| JP | 2008188631 | A | 8/2008 |
| JP | 4174150 | B2 | 10/2008 |
| JP | 4551144 | B2 | 9/2010 |
| JP | 5406502 | B2 | 2/2014 |
| JP | 5555679 | B2 | 7/2014 |
| JP | 5707206 | B2 | 4/2015 |
| JP | 2020151729 | A | 9/2020 |
| WO | WO 1992/012362 | A1 | 7/1992 |

OTHER PUBLICATIONS

International Search Report and Written Opinion of International Searching Authority for International Patent Application No. PCT/US2022/042591, mailed Feb. 15, 2023 (16 pages).

* cited by examiner

LINEAR-ACTUATED PRESS MACHINE HAVING MULTIPLE MOTORS AND CLUTCH SYSTEM FOR MULTI-SPEED DRIVE FUNCTIONALITY

RELATED APPLICATIONS

This application is a continuation of U.S. application Ser. No. 17/933,741, filed Sep. 20, 2022, now allowed, which is a continuation-in-part of U.S. application Ser. No. 17/806, 268, filed Jun. 9, 2022, now issued as U.S. Pat. No. 11,541, 618, which claims priority to and the benefit of U.S. Provisional Application Ser. No. 63/261,453, filed Sep. 21, 2021, and U.S. Provisional Application Ser. No. 63/263,603, filed Nov. 5, 2021, each of which is herein incorporated by reference in its entirety.

COPYRIGHT

A portion of the disclosure of this patent document may contain material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to press machines for forming parts. More particularly, this invention relates to press machine that includes motors that are coupled to an actuator for driving the actuator in a linear direction at various speeds and with various torques.

BACKGROUND OF THE INVENTION

In a typical linear-actuated press, there are a pair of tools that are used to form a part. (e.g., a die used to bend a part). One tool in the pair of tools is typically stationary. The other tool moves in a linear fashion toward the stationary tool. The to-be-formed part is located between the pair of tools and is formed by the pressing force created by the moving tool. The linear motion of the moving tool is typically created by a motor that rotates a male-and-female screw mechanism that directly or indirectly couples the moving tool to the output shaft of the motor.

The moving tool in a linear-actuated press engages in linear movement in two directions. In the downward stroke, the moving toot is moved downwardly with no resistive force to the point in which it engages the to-be-formed part. The tool then continues the downward movement as it engages the part to form it in the upward stroke, the tool moves away from the now formed part. The productivity of these machines (e.g., parts formed per unit time) is dependent on the speed at which the tool can be moved downwardly to engage the to-be-formed part and upwardly to move away from the formed part. This type of operation can be effectuated in smaller presses with fair productivity (e.g., 50 ton-presses or less) in that the same motor can deliver enough vertical speed to the moving tool and also enough torque to create the force necessary on the moving tool for forming the part.

However, in large presses (e.g., greater than 50-ton presses, such as a 100-ton press or more), the problem is that a motor cannot be commercially selected that delivers both the high-speed condition to advance the tool to the to-be-formed part and the high-torque condition necessary for forming the part. If the motor is chosen that is capable of delivering the high torque (i.e., to produce high force on the moving tool), its rotational speed and, hence, the vertical speed of the moving tool is limited. Thus, the machine's productivity is compromised because it takes too much time to advance the moving tool to the part and retract the tool from the formed part.

Consequently, large presses commonly utilize hydraulic actuators that can deliver the high forces for forming the part and do so with acceptable speed so as to have adequate productivity. However, there are several problems associated with hydraulic actuators, such as the temperature dependency of the working fluid and the messiness of hydraulic fluid that flows through various pumps, valves, and filters, often resulting in leaks of the fluid within the manufacturing facility. Furthermore, many large presses are driven by crankshafts that are critical components requiring significant bearings with tight tolerances and lubrications systems for preventive maintenance. Crankshafts for these high-force presses also require the use of a flywheels and counterbalance systems for creation of bearing journal clearances for lubrication, which that can also be problematic. Further, large presses using a crankshafts and flywheels often require to two or more connecting rods that attach to the ram slide and are subject to timing issues if they become twisted or bent. These crankshafts are subject to deformation when the mechanical press is under certain conditions, such as when they are overloaded or become stuck at bottom dead center.

The present disclosure provides for a linear-actuated press machine that delivers high forces (such as attainable in a hydraulic press) with the controllability and high speeds that increase productivity and without the problems associated with hydraulic presses. The linear-actuated press system also avoids the problems associated with high-force presses that use crankshafts for driving the press ram.

All these and other objects of the present invention will be understood through the detailed description of the invention below.

SUMMARY OF THE INVENTION

In one aspect, the present invention is directed to a press machine for forming a part, comprising a moveable press ram, an actuator, a first motor, and a second motor. The moveable press ram is for holding a tool that forms the part. The actuator moves the moveable press ram. The actuator includes a first male-female thread mechanism for producing a first linear movement of the moveable press ram and a second male-female thread mechanism for producing a second linear movement of the movable press ram. The first linear movement is a high-force linear movement condition and the second linear movement is a high-speed linear movement condition. The first motor drives the first male-female thread mechanism to produce the first linear movement. The second motor drives the second male-female thread mechanism to produce the second linear movement.

In another aspect, the present invention is a press machine for forming a part comprising a moveable press ram, an actuator, a first motor, and a second motor. The moveable press ram is for holding a tool that forms the part. The actuator moves the moveable press ram by use of at least one male-female thread mechanism for producing a linear movement of the press ram. The first motor drives the actuator to produce a high-force linear movement condition to the moveable press ram. The second motor drives the actuator to produce a high-speed linear movement condition to the moveable press ram. The first motor and second motor linearly move away from each other when the first motor is operational driving pressing ram. One way this is accomplished is by optionally mounting the second motor to the press ram such that it moves with the moveable press ram.

In a further aspect, a press machine for forming a part comprises a moveable press ram, an actuator, a first motor, and a second motor. The moveable press ram holds a tool that forms the part. The actuator moves the moveable press ram. The actuator includes a first male-female thread mechanism for producing a first linear movement of the moveable tool and a second male-female thread mechanism for producing a second linear movement of the movable press ram. The first linear movement is a high-force linear movement condition and the second linear movement is a high-speed linear movement condition. The first motor drives the first male-female thread mechanism to produce the first linear movement. The second motor for driving the second male-female thread mechanism to produce the second linear movement.

In another aspect, the invention is a method of operating a linear-actuated press machine for forming a part. The press machine comprises a first motor, a second motor, a linear actuator having a first male-female thread mechanism and a second male-female thread mechanism, and a tool coupled to the linear actuator. The method comprises (i) by use of the second motor and the second male-female thread mechanism, advancing the tool toward the part in a low-force and high-linear-speed condition, (ii) by use of the first motor and the first male-female thread mechanism, forming the part with the tool in a high-force and low-linear-speed condition, and (iii) after the part has been formed by the tool, retracting the tool from the part by use of at least one of the first motor and the second motor.

In another aspect, the invention is a press machine for forming a part comprises a moveable press ram, an actuator, a first motor system, a second motor system, and a belt system. The moveable press ram is for holding a tool that forms the part. The actuator moves the moveable press ram by use of a male-female thread mechanism for producing a linear movement of the moveable press ram. The actuator includes an actuator sprocket coupled to the male-female thread mechanism. The first motor system produces a high-force linear movement condition to the moveable press ram. The first motor system includes a clutch coupled to a first motor and a first motor sprocket coupled to the clutch. The second motor system produces a high-speed linear movement condition to the moveable press ram. The second motor system includes a second motor coupled to a second motor sprocket. The belt system couples the actuator sprocket, the first motor sprocket, and the second motor sprocket such that (i) operation of the first motor rotates the actuator sprocket, the first motor sprocket, and the second motor sprocket, and (ii) operation of the second motor rotates the actuator sprocket, the first motor sprocket, and the second motor sprocket. The clutch allows the first motor to partially or fully disengage from rotational movement of the first sprocket when the belt is being driven by the second motor.

In a further aspect, the invention is a method of operating a linear-actuated press machine for forming a part. The press machine comprises a first motor, a second motor, a linear actuator having a male-female thread mechanism, a tool coupled to the linear actuator, and a belt system coupling the first motor, the second motor, and the male-female thread mechanism. The method comprises (i) by use of the second motor and the belt system, advancing the tool toward the part in a low-force and high-linear-speed condition, (ii) while advancing the tool in the low-force and high-linear-speed condition, partially or fully disengaging the first motor from rotational movement caused by the belt system, (iii) by use of the first motor and the belt system, forming the part with the tool in a high-force and low-linear-speed condition, and (iv) after the part has been formed by the tool, retracting the tool from the part by use of the second motor.

In another aspect, the present disclosure is a method of operating a linear-actuated press machine for forming a part. The press machine comprises a first motor, a second motor, a linear actuator having a male-female thread mechanism, a press ram coupled to linear actuator and holding a tool, and a clutch coupled to the first motor. The method comprises (i) driving the linear actuator with the second motor to advance the press ram toward the part in a low-force and high-linear-speed condition, (ii) while advancing the press ram toward the part in the low-force and high-linear-speed condition, partially or fully disengaging the clutch so as to reduce the rotational movement on the first motor, (iii) driving the linear actuator with the first motor to form the part with the tool in a high-force and low-linear-speed condition, (iv) after the part has been formed by the tool, retracting the tool from the part by use of at least the second motor, and (v) while retracting the press ram from the part in a second low-force and high-linear-speed condition, partially or fully disengaging the clutch so as to reduce the rotational movement on the first motor.

In a further embodiment, a linear-actuated press machine for forming a part comprises a moveable press ram, an actuator, a first motor system, a second motor system, and a belt system. The moveable press ram holds a tool that forms the part. The actuator moves the moveable press ram by use of a male-female thread mechanism for producing a linear movement of the moveable press ram. The actuator includes at least one sprocket for driving the actuator. The at least one sprocket is coupled to the male-female thread mechanism for rotating the male-female thread mechanism. The first motor system produces a low-speed high-force linear movement to the moveable press ram via the actuator. The first motor system includes a first motor, a clutch operationally coupled to the first motor, and a first motor sprocket operationally coupled to the clutch. The second motor system produces a high-speed low-force linear movement to the moveable press ram via the actuator. The second motor system includes a second motor and a second motor sprocket operationally coupled to the second motor. The belt system couples the at least one actuator sprocket, the first motor sprocket, and the second motor sprocket. During the high-speed low-force linear movement of the second motor system to advance or retract the press ram relative to the part, the clutch is at least partially disengaged from the first motor to maintain a rotational speed of the first motor below a limit to reduce possible damage to the first motor. During the low-speed high-force linear movement of the first motor system to form the part, the clutch is operationally engaged to transfer high torque from the first motor to the linear actuator via the belt system.

In another embodiment, a press system for forming a part comprises a first linear actuator, a second linear actuator, a press ram, a high-speed motor, a first high-torque motor, a second high-torque motor, a first clutch, and a second clutch. The first linear actuator has a first male-female screw arrangement and a first actuator rod that is coupled to the first male-female screw arrangement. The first actuator rod undergoes linear movement in response to rotational movement of the first male-female screw arrangement. The second linear actuator has a second male-female screw arrangement and a second actuator rod that is coupled to the second male-female screw arrangement. The second actuator rod undergoes linear movement in response to rotational movement of the second male-female screw arrangement. The press ram is coupled to the first actuator rod and the second actuator rod. The press ram receives a tool for engaging and forming the part. The press ram undergoes movement toward or away from the part in response to the corresponding linear movement of the first and second actuator rods. The high-speed motor is coupled to the first male-female screw arrangement of the first linear actuator for providing a high-speed and low-force condition on the press ram. The high-speed motor is for advancing the press ram toward the part and retracting the press ram from the part. The first high-torque motor is coupled to the first male-female screw arrangement of the first linear actuator. The second high-torque motor is coupled to the second male-female screw arrangement of the second linear actuator. The first and second high-torque motors provide a low-speed and high-force condition on the press ram for forming the part. The first clutch that is operatively coupled to the first high-torque motor. The second clutch that is operatively coupled to the second high-torque motor. While the high-speed motor is providing a high-speed and low-force condition on the press ram, the first and second clutches are partially or fully disengaging so as to reduce the rotational movement on the first and second high-torque motors.

In another aspect, the invention is a press machine for forming a part comprising a moveable press ram, an actuator, a first motor system, and a belt. The moveable press ram is for holding a tool that assists in forming the part. The actuator moves the moveable press ram by use of a male-female thread mechanism for producing a linear movement of the moveable press ram. The actuator includes an actuator sprocket coupled to the male-female thread mechanism. The first motor system produces a linear movement to the moveable press ram via the actuator. The first motor system includes a first motor, a multi-speed gearbox coupled the first motor, and a motor sprocket coupled to the multi-speed gearbox. The belt couples the actuator sprocket and the motor sprocket. The multiple-speed gearbox allows the first motor to provide the linear movement (i) in a low-force and high-linear-speed condition to advance and retract the press ram and (ii) in a high-force and low-linear-speed condition when the press ram is forming the part with the tool.

In a further aspect, the present invention is a linear-actuated press machine for forming a part that comprises a moveable press, an actuator, a first motor drive system, and a second motor drive system. The moveable press ram is for holding a tool that forms the part. The actuator includes an actuator rod and a male-female thread mechanism. The male-female thread mechanism includes a rotatable screw and a nut that translates vertically along the rotatable screw. The actuator rod is coupled to the nut and to the moveable press ram. The actuator rod produces a linear movement for the moveable press ram. The actuator further includes at least one actuator sprocket for driving the rotatable screw. The first motor drive system is for producing a low-speed high-force linear movement to the moveable press ram via the actuator. The low-speed high-force linear movement causes greater than 100 tons of force to be delivered by the tool to the part. The first motor drive system includes a first motor for directly driving a first motor sprocket, a bi-directional clutch located on an intermediate shaft that is positioned away from the first motor and the actuator. A first belt couples the first motor sprocket to the intermediate shaft. A second belt couples the intermediate shaft to the at least one actuator sprocket. A second motor drive system is for producing a high-speed low-force linear movement to the moveable press ram via the actuator. The second motor drive system includes a second motor for directly driving a second motor sprocket and a third belt coupling the at least one actuator sprocket to the second actuator sprocket. In response to the high-speed low-force linear movement of the second motor drive system advancing the press ram toward the part, (i) the at least one actuator sprocket drives the second belt at a high rotational speed in a first direction, and (ii) the bi-directional clutch at least partially disengages the first motor to maintain a rotational speed of the first motor below a limit to reduce possible damage to the first motor. And in response to the low-speed high-force linear movement of the first motor system to form the part, the bi-directional clutch is operationally engaged to transfer torque from the first motor to the at least one actuator sprocket of the linear actuator via the first and second belts. And, in response to the high-speed low-force linear movement of the second motor drive system retracting the press ram from the part after the part has been formed, (i) the at least one actuator sprocket drives the second belt at a high rotational speed in a second direction that is opposite to the first direction, and (ii) the clutch at least partially disengages the first motor to maintain a rotational speed of the first motor below a limit to reduce possible damage to the first motor.

In another aspect, the present invention is a press system for forming a part that comprises a first linear actuator, a second linear actuator, a press ram, a high speed motor, a first high-torque motor, a second high-torque motor, a first clutch, and a second clutch. The first linear actuator has a first male-female screw arrangement and a first actuator rod that is coupled to the first male-female screw arrangement. The first male-female thread mechanism includes a first actuator screw that rotates but remains linearly stationary, and a first nut that moves along the first actuator screw as the first actuator screw rotates. The first actuator rod is coupled to the first nut. The first actuator rod undergoes linear movement in response to rotational movement of the first actuator screw. A second linear actuator has a second male-female screw arrangement and a second actuator rod that is coupled to the second male-female screw arrangement. The second male-female thread mechanism includes a second actuator screw that rotates but remains linearly stationary, and a second nut that moves along the second actuator screw as the second actuator screw rotates. The second actuator rod is coupled to the second nut. The second actuator rod undergoes linear movement in response to rotational movement of the second actuator screw. The press ram is coupled to the first actuator rod and the second actuator rod. The press ram is for receiving a tool for forming the part. The press ram is configured to undergo movement toward and away from the part in response to the corresponding linear movement of the first and second actuator rods. The high-speed motor is coupled to the first male-female screw arrangement of the first linear actuator for providing a high-speed and low-force condition on the press ram. The high-speed motor is for advancing the press ram toward the part and retracting the press ram from the part. A first high-torque motor is coupled to the first male-female screw arrangement of the first linear actuator. The second high-torque motor is coupled to the second male-female screw arrangement of the second linear actuator. The first and second high-torque motors are for providing a low-speed and high-force condition on the press ram for forming the part. The first clutch is operatively coupled to the first high-torque motor. The first clutch is a bi-directional clutch which limits the rotational speed of the first high-torque motor in a first direction when the press ram advances toward the part, and in a second direction when the press ram retracts away from the part. A second clutch is operatively coupled to the second high-torque motor. The second clutch is a bi-directional clutch which limits the rotational speed of the second high-torque motor in the first direction when the press ram advances toward the part, and in the second direction when the press ram retracts away from the part. While the high-speed motor is providing a high-speed and low-force condition with a velocity of at least 400 inches per minute to the press ram, the first and second clutches are partially or fully disengaging so as to limit the rotational movement on the first and second high-torque motor. The first and second high-torque motors produce at least 200 tons of force for the press ram for forming the part.

In another aspect, the invention is a method of operating a linear-actuated press machine for forming a part. The press machine comprises a first motor, a second motor, a linear actuator having a male-female thread mechanism with a rotatable screw and a nut that moves along the rotatable screw. A press ram holds a tool and is coupled to the linear actuator via an actuator rod. The actuator rod is coupled to the nut. The method comprises: (i) driving the linear actuator with the second motor to advance the press ram toward the part in a low-force and high-linear-speed condition; (ii) while advancing the press ram toward the part in the low-force and high-linear-speed condition of the second motor, partially or fully disengaging a clutch so as to reduce the rotational movement on the first motor, the clutch being located on an intermediate shaft that is positioned away from the first motor and the linear actuator; (iii) subsequent to acts (i) and (ii), engaging the clutch to drive the linear actuator with the first motor to form the part with the tool in a low-speed and high-force linear movement condition, the low-speed and high-force linear movement condition causing greater than 100 tons of force to be delivered by the tool to the part; (iv) after the part has been formed by the tool, retracting the press ram from the part by use of the second motor; and (v) while retracting the press ram by use of the second motor, partially or fully disengaging the clutch so as to reduce the rotational movement on the first motor.

A linear-actuated press machine for forming a part comprises a moveable press ram, a first actuator, a first motor system, a second motor system, a second actuator and a third motor system. The moveable press ram is for holding a tool that forms the part. The first actuator is for moving the moveable press ram by use of a first male-female thread mechanism for producing a linear movement of the moveable press ram. The first actuator includes at least one first actuator sprocket for driving the first actuator. The at least one first actuator sprocket is coupled to the first male-female thread mechanism for rotating the first male-female thread mechanism. The first motor system is for producing a low-speed high-force linear movement to the moveable press ram via the first actuator. The first motor system includes a first motor, a first clutch operationally coupled to the first motor, a first motor sprocket operationally coupled to the first clutch, a first belt system coupling the first motor sprocket to the at least one first actuator sprocket. The second motor system is for producing a high-speed low-force linear movement to the moveable press ram via the first actuator. The second motor system includes a second motor, a second motor sprocket operationally coupled to the second motor, and a second belt system coupling the second motor sprocket to the at least one first actuator sprocket. The second actuator is for moving the moveable press ram by use of a second male-female thread mechanism for producing the linear movement of the moveable press ram. The second actuator includes at least one second actuator sprocket for driving the second actuator. The at least one second actuator sprocket is coupled to the second male-female thread mechanism for rotating the second male-female thread mechanism. The third motor system is for producing, in conjunction with the first motor system, the low-speed high-force linear movement to the moveable press ram. The third motor system is coupled to the second actuator. The third motor system includes a third motor, a second clutch operationally coupled to the third motor, a third motor sprocket operationally coupled to the second clutch, and a third belt system coupling the third motor sprocket to the at least one second actuator sprocket. During the high-speed low-force linear movement of the second motor system to advance or retract the press ram relative to the part, (i) the first clutch is at least partially disengaged from the first motor to maintain a rotational speed of the first motor below a limit to reduce possible damage to the first motor, and (ii) the second clutch is at least partially disengaged from the third motor to maintain a rotational speed of the third motor below a limit to reduce possible damage to the third motor. During the low-speed high-force linear movement of the first motor system and third motor system to form the part, (i) the first clutch is operationally engaged to transfer high torque from the first motor to the first linear actuator, and (ii) the second clutch is operationally engaged to transfer high torque from the third motor to the second linear actuator.

The present invention is also a method of operating a linear-actuated press machine for forming a part. The press machine comprises a first motor, a second motor, a linear actuator having a male-female thread mechanism, a press ram coupled to linear actuator and for holding a tool, and a clutch coupled to the first motor. The method comprises (a) driving the linear actuator with the second motor to advance the press ram toward the part in a first low-force and high-linear-speed condition. The clutch is partially or fully disengaged so as to reduce the rotational movement on the first motor while the press ram is advancing toward the part in the first low-force and high-linear-speed condition; (b) in response to the press ram being a distance “X” from the part, (i) reducing the rotational drive speed at the linear actuator provided by the second motor to reduce the linear velocity of the press ram and (ii) monitoring the rotational drive speed at the linear actuator with a second sensor; (c) during the reducing and while the clutch remains partially or fully disengaged, operating the first motor and sensing a first motor rotational speed with a first sensor; (d) in response to the first motor rotational speed being a value that should provide approximately the same rotational drive speed at the linear actuator as the rotational drive speed measured by the second sensor, engaging the clutch to provide a high-force and low-linear-speed condition to the press ram from the first motor; (e) forming the part with the tool in the high-force and low-linear-speed condition; (f) after the forming of the part, retracting the tool from the part by use of at least one of the first motor and the second motor; and (g) subsequent to the retracting, (i) increasing the velocity of the press ram in a direction away from the formed part by use of the second motor to create a second low-force and high-linear-speed condition, and (ii) partially or fully disengaging the clutch so as to limit the rotational movement on the first motor during the second low-force and high-linear-speed condition.

In yet a further aspect, the present invention is a press system for forming a part that comprises a first linear actuator, a second linear actuator, a third linear actuator, a press ram, a first motor, a second motor, a third motor, a first clutch, and a second clutch. The first linear actuator has a first male-female screw arrangement and a first actuator rod that is coupled to the first male-female screw arrangement. The first actuator rod undergoes linear movement in response to rotational movement of the first male-female screw arrangement. The second linear actuator has a second male-female screw arrangement and a second actuator rod that is coupled to the second male-female screw arrangement. The second actuator rod undergoes linear movement in response to rotational movement of the second male-female screw arrangement. A third linear actuator has a third male-female screw arrangement and a third actuator rod that is coupled to the third male-female screw arrangement. The third actuator rod undergoes linear movement in response to rotational movement of the third male-female screw arrangement. The press ram is coupled to the first actuator rod, the second actuator rod, and the third actuator rod. The press ram is for receiving a tool for forming the part. The press ram is configured to undergo movement toward and away from the part in response to being driven by the first, second, and third actuator rods. The first motor is coupled to the first male-female screw arrangement of the first linear actuator. The second motor is coupled to the second male-female screw arrangement of the second linear actuator. The first and second motors are for providing a low-speed and high-force condition on the press ram for forming the part. The third motor is coupled to the third male-female screw arrangement of the third linear actuator for providing a high-speed and low-force condition on the press ram. The third motor is for advancing the press ram toward the part and retracting the press ram from the part. The first clutch is operatively coupled to the first motor. The second clutch that is operatively coupled to the second motor. While the third motor is providing a high-speed and low-force condition on the press ram, the first and second clutches are partially or fully disengaging so as to limit the rotational movement on the first and second motors. During the low-speed and high-force condition from the first and second motors for forming the part, (i) the first clutch is operationally engaged to transfer high torque from the first motor to the first linear actuator, and (ii) the second clutch is operationally engaged to transfer high torque from the second motor to the second linear actuator.

In all of the aspects of the present invention defined above, each linear actuator within the press machine preferably produces at least 100 tons of force on the press ram for forming the part, such that multiple actuators with high-torque motor systems can deliver a scalable amount of force to the press ram. Meanwhile, the linear actuator associated with the high-speed motor system (which can be the same linear actuator as the high-torque motor system) advances and/or retracts the press ram at velocities of at least 400 inches per minute, or more preferably at least 500 inches per minute, or most preferably greater than 600 inches per minute.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The present invention will be described with greater specificity and clarity with reference to the following drawings, in which.

Figure 1:
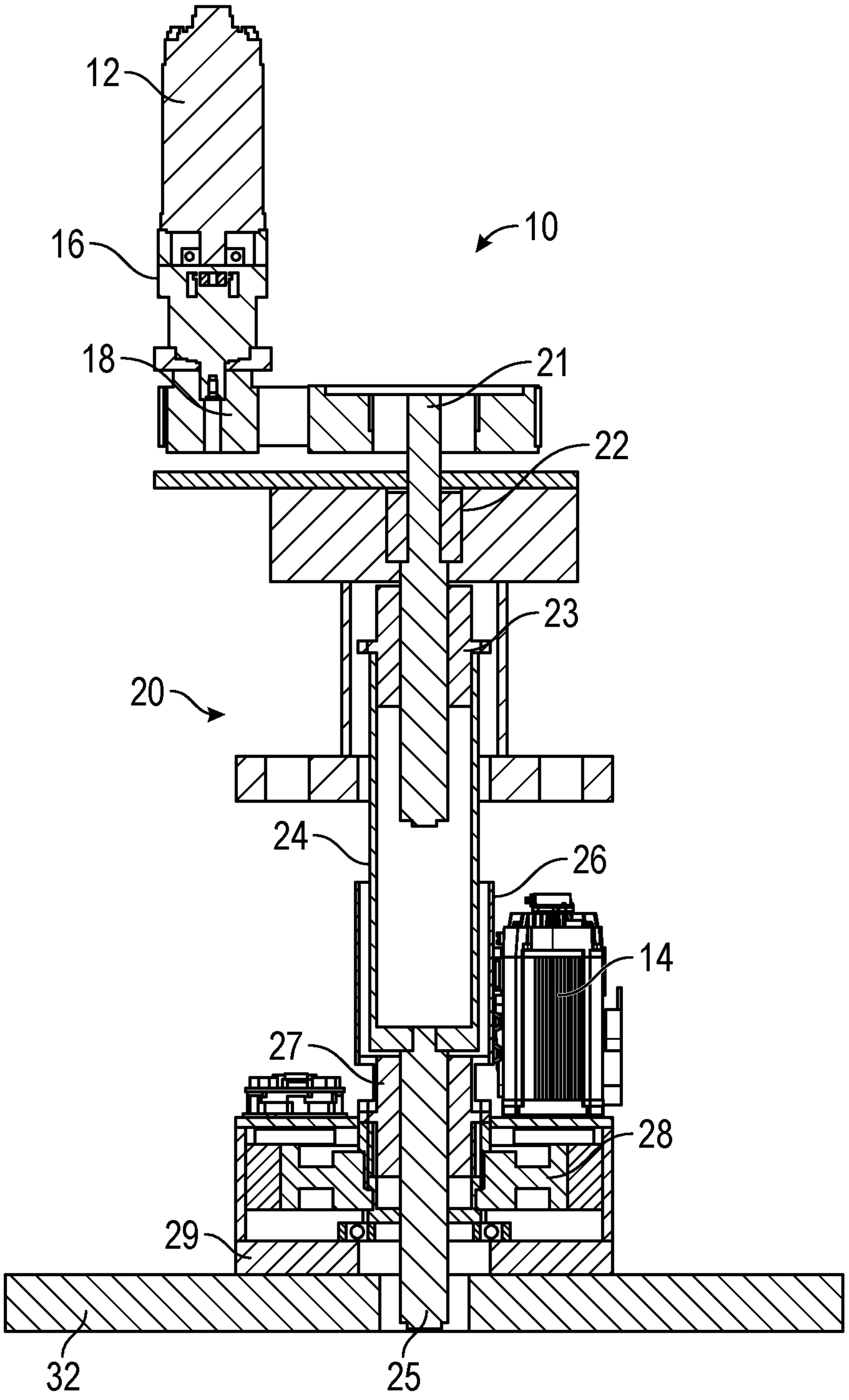
FIG. 1 illustrates a side view of one embodiment of a press machine that uses a linear actuator with two motors and two male-female threaded mechanisms for controlling the linear velocity and force of the press ram.

While the invention is susceptible to various modifications and alternative forms, specific embodiments will be shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE DRAWINGS

The drawings will herein be described in detail with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

Figure 2:
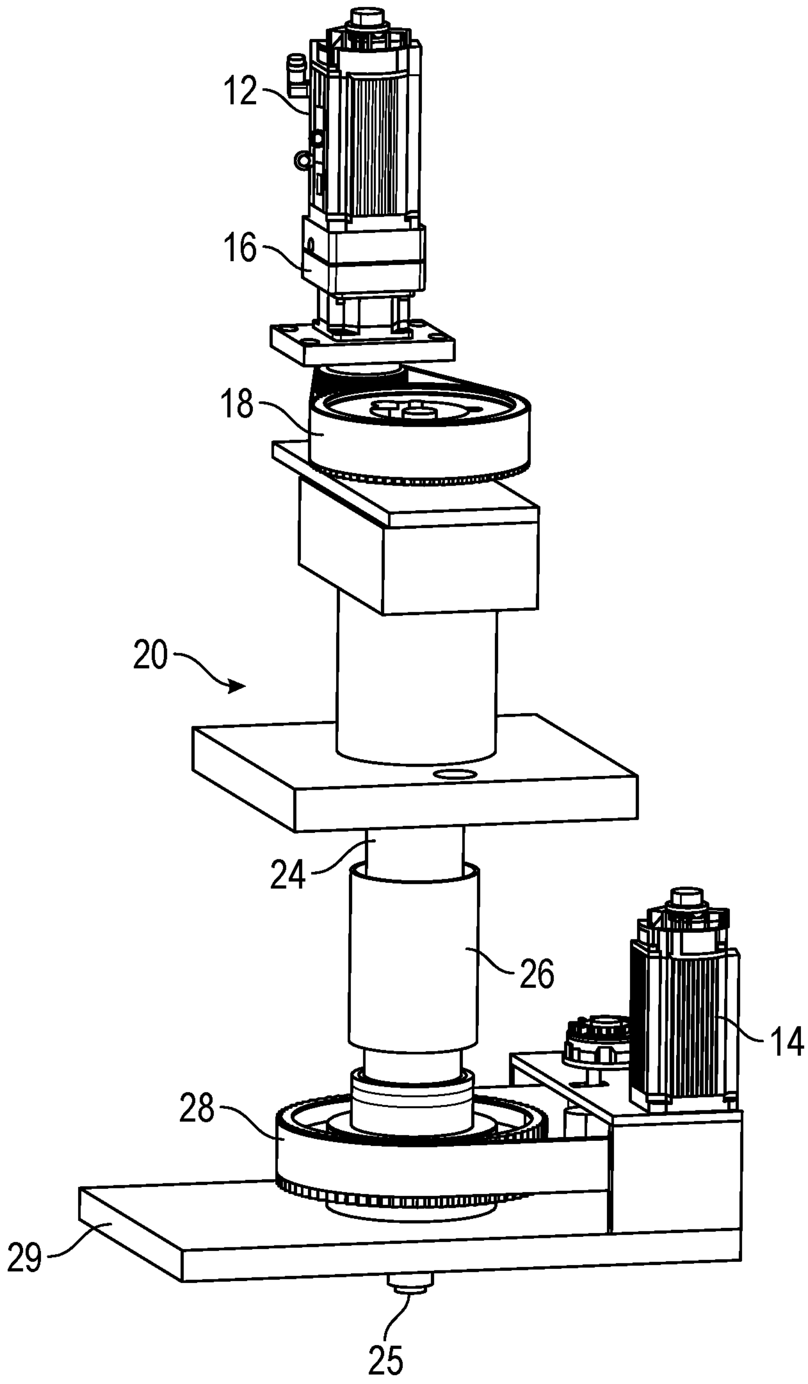
FIG. 2 illustrates a perspective view of the linear actuator for the press machine of FIG. 1.

As shown in FIGS. 1 and 2, a linear-actuated press machine 10 includes a first motor 12 and a second motor 14 (discussed further below) that are used to drive the press machine 10. A gearbox 16 is coupled to the output shaft of the first motor 12 and the output of the gearbox 16 is used to drive a pulley and belt system 18. The gearbox 16 allows for on-the-fly adjustments to the output of the first motor 12 before it is transferred to the pulley and belt system 18. The output shaft of the gearbox 16 spins slower than the input shaft from the first motor 12 at a fixed ratio. (e.g., when there is a 12:1 ratio, the input shaft RPM divided by 12 is the output shaft RPM). The gearbox 16 also increases the torque output of the first motor 12 by a factor corresponding to the fixed ratio. Therefore, the output shaft speed (and torque) of the gearbox 16 is a variable that depends on the variable input shaft from the first motor 12.

The pulley and belt system 18 is also coupled the linear actuator 20 by connection to the upper screw 21 of the actuator 20. Consequently, when the first motor 12 is operational, the upper screw 21 of the actuator 20 rotates as well. The upper screw 21 is permitted to rotate, without moving vertically, and is supported by at least one thrust bearing 22. The linear actuator 20 further includes a planetary roller nut 23 (or other threaded structure) that is threadably connected to the upper screw 21. The planetary roller nut 23 is externally shaped to non-rotationally lock within the structure of the actuator 20, such that rotation of the upper screw 21 causes vertical movement of the roller nut 23. The roller nut 23 is integrated with or connected to an upper tube 24 of the actuator. Consequently, when the first motor 12 is operational, the upper screw 21 is rotating at a known speed and with a known torque, which causes the roller nut 23 and upper tube 24 to linearly move at a known linear velocity and with a known force.

At its lower end, the upper tube 24 is also rigidly connected to a lower screw 25, such that any vertical movement of the upper tube 24 also causes corresponding vertical movement of the lower screw 25. The upper tube 24 is also telescopically fitted within a lower tube 26 that is coupled to a lower planetary nut 27 (or other threaded structure). As the second motor 14 operates, it turns a second pulley and belt system 28 that then rotates the lower planetary roller nut 27. As the lower planetary roller nut 27 rotates, it moves vertically along the fixed lower screw 25. The second motor 14, the second pulley and belt system 28, the lower planetary roller nut 27, and the lower tube 26 are all fixedly mounted on a platform 29. This platform 29, which is at the lower end of the actuator 20, is mounted to the press ram 32, which shown in more details in FIGS. 4A-4C, such that movement of the platform 29 leads to the movement of the press ram 32 (and any type of tool attached to the press ram 32), as discussed below.

Figure 3C:
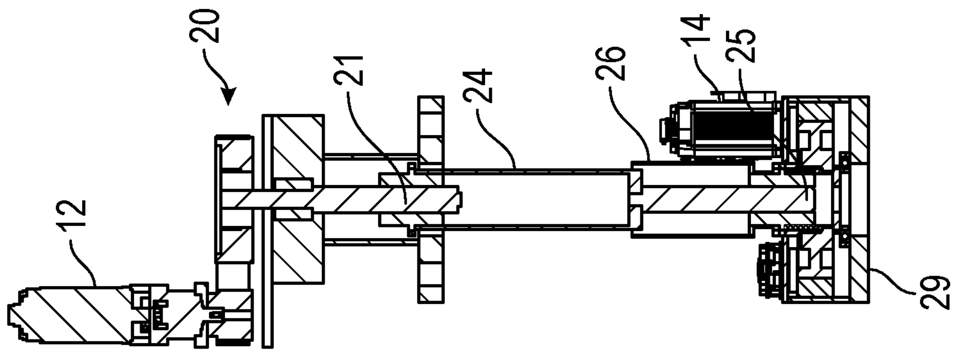
FIG. 3C illustrates a side view of the actuator of the linear-actuated press in which the high-speed section is fully extended and the high-force section is fully extended.
Figure 3B:
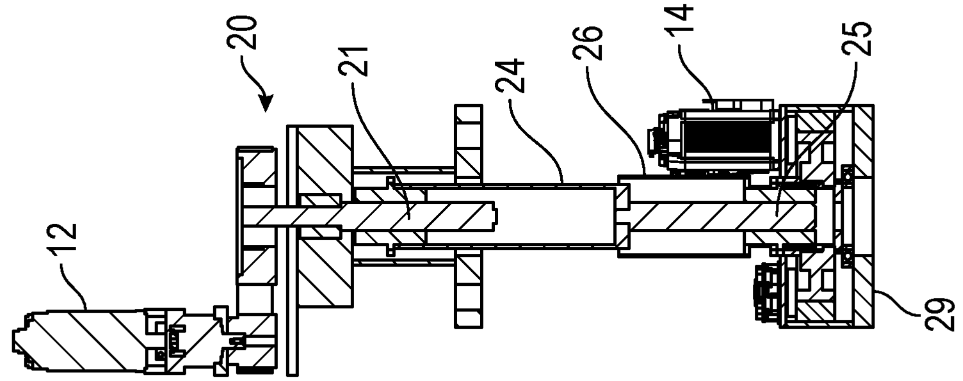
FIG. 3B illustrates a side view of the actuator for the linear-actuated press in which the high-speed section is fully extended.
Figure 3A:
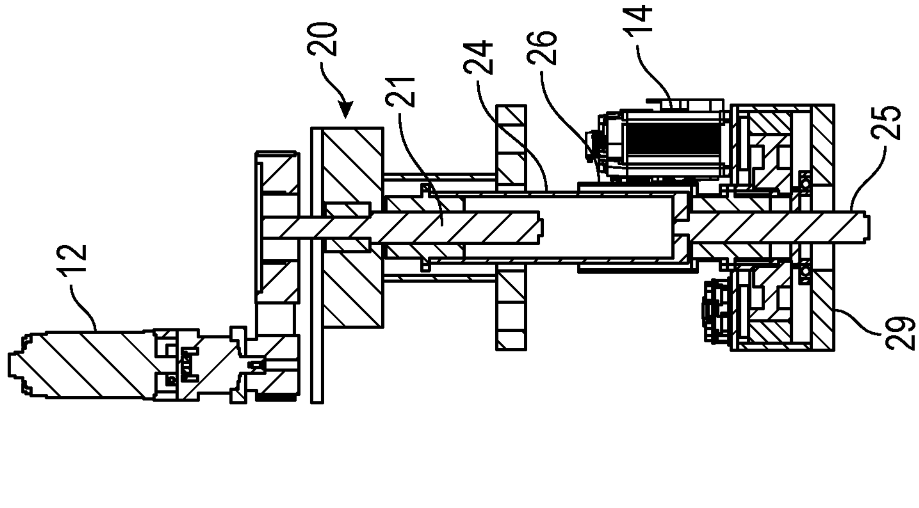
FIG. 3A illustrates a side view of the actuator for the linear-actuated press in a fully retracted position.
Figure 4C:
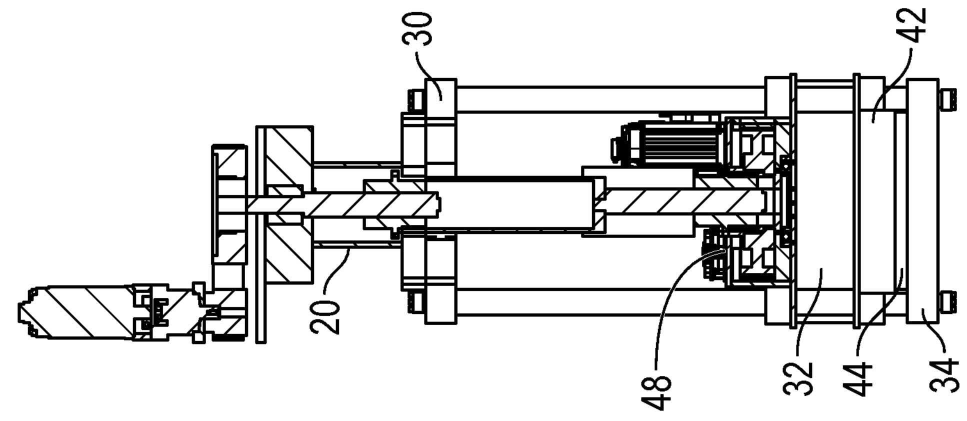
FIG. 4C illustrates the linear-actuated press in a closed state.
Figure 4B:
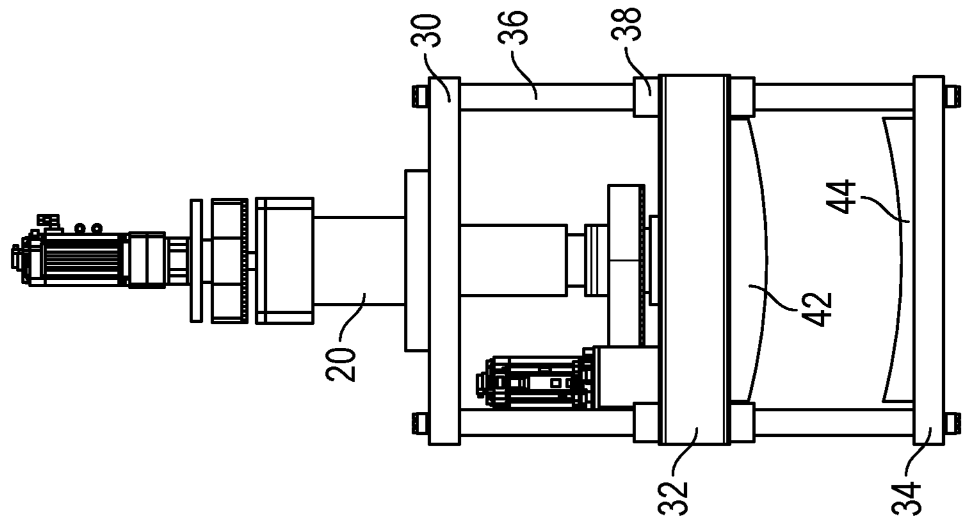
FIG. 4B illustrates a second side view the linear-actuated press in an open state.
Figure 4A:
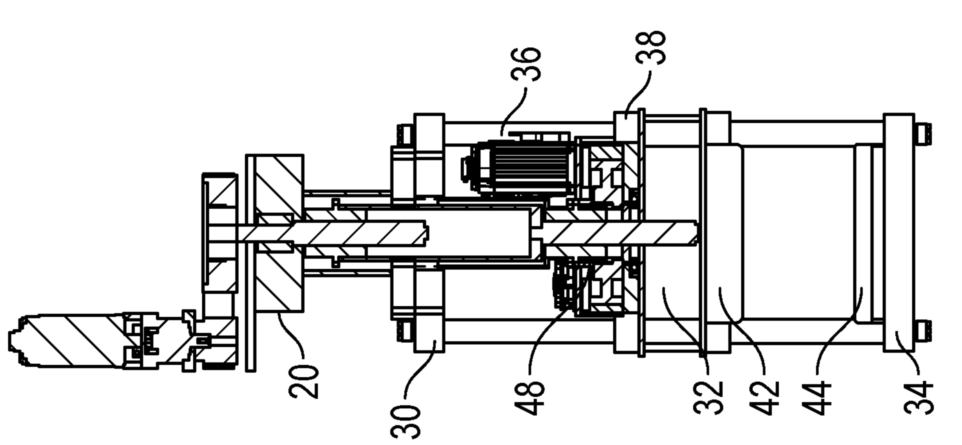
FIG. 4A illustrates a first side view the linear-actuated press in an open state.

FIGS. 3A-3C illustrate the operation of the actuator 20, which causes the platform 29 to move and drive the press ram 32 that is shown in FIGS. 4A-4C. FIG. 3A illustrates the actuator 20 in the fully retracted position, which would lead to the press machine 10 being in an opened position, as shown in FIGS. 4A and 4B. FIG. 3B illustrates the actuator 20 after the second motor 14 has been activated to cause high-speed rotation to the roller nut 27, causing it to rotate around the lower screw 25 and linearly move downwardly in a high speed condition along with the lower tube 26 and the platform 29 (and hence the press ram 32 of FIGS. 4A-4C). Because the press machine 10 is not forming the part in this phase of movement, the amount of torque required by the second motor 14 is low, allowing it to be designed for a high-speed movement to quickly advance the press ram 32 and attached tool to a point where the tool can begin forming the part.

Once the upper tool engages the part, the second motor 14 stops operation and the first motor 12 begins to operate, as shown in FIG. 3C. The first motor 12 causes the upper screw 21 to rotate at a lower speed, but with high-torque, which provides enough linear force on the upper tube 24 and the attached lower screw 25 that is fixedly attached to the upper tube 24. The telescopic movement of the upper tube 24 within the lower tube 26 helps to stabilize the actuator 20 while high downward force is transferred by the platform 29 to the press ram 32 (FIG. 4) and the attached upper tool. Thus, FIG. 3C illustrates the actuator 20 in a fully extended position that was brought about by the first male-female thread mechanism associated with the first motor 12, the second male-female thread mechanism associated with the second motor 14, and the telescoping upper and lower tubes 24, 26.

FIGS. 4A-4C illustrate the overall movement for the press 10 for forming a part in the press 10 based on the movements of the linear actuator 20 in FIGS. 3A-3C. FIGS. 4A and 4B are two side views of the press machine 10 in the opened position. The main body of the actuator 20 is mounted on the press crown 30, which remains in a fixed position. The vertical movement of the platform 29 caused by the actuator 20 creates corresponding vertical movement of the press ram 32 to which it is attached. The press ram 32 holds an upper tool 42 and a press bed 34 may hold a lower tool 44. The to-be-formed part (e.g., a piece of sheet metal) is placed between the upper tool 42 and the lower tool 44. The press ram 32, which is a four-post press, includes ram guide bushings 38 that slide along the ram guideposts 36 as the press ram 32 moves relative to the press bed 34.

As shown in FIG. 4C, the upper tool 42 and the lower tool 44 are in close proximity with the now-formed part located between them when the press machine 10 is in the closed position. To transition to that closed position, the second motor 14 creates the high-speed linear movement of the press ram 32 and the upper tool 42 until the upper tool 42 is in an operational or engagement position immediately adjacent to or on the to-be-formed part, which is typically resting on the lower tool 44. Then, the first motor 12 creates the high-torque linear movement (with slower linear speed) for the press ram 32 and the upper tool 42 to form the part with high force. After the part is formed, the second motor 14 operates in the reverse fashion to retract the upper tool 42 from the now-formed part with high linear speed, such that the formed part can be removed from the press machine 10 and a new unformed part can be inserted between the tools 42, 44 for forming in the next cycle.

Consequently, the linear force and linear speed of the press ram 32 is controlled by the operation of the first motor 12 and the second motor 14. During the downward advancement stroke when the press ram 32 and upper tool 42 are moving toward the to-be formed part, the linear motion of the press ram 28 is preferably at a high speed since no force is yet needed for forming at this point. This is accomplished by operating the second motor 14 that drives the lower roller nut 27, causing it to quickly rotate around the lower screw 25 (FIG. 1). When the upper tool 42 begins to engage the part, more force is needed. In this working stroke, the second motor 14 stops movement and the first motor 12 begins to drive the upper screw 21 with lower rotational speed, but with high torque, to advance the upper nut 23 downwardly along the upper screw 21 with high force. To aid in the high-torque condition, the rotation of the lower roller nut 27 is held by a brake 48 to prevent the lower roller nut 27 from inadvertently advancing upwardly along the lower screw 25 when the large force is placed on the press ram 32. In other words, the brake 48 ensures that the downward force on the press ram 32 does not result in any back-driving on the actuator 20 (i.e., unintended rotation of the lower roller nut 27 along the stationary lower screw 25 while higher force is being transferring to the press ram 32).

By using the two separate threaded screw mechanisms controlled by two separate motors 12 and 14, different types of outputs to the press ram 32 can be supplied. The overall productivity of the press machine 10 can be increased because the moving upper tool 42 can be quickly advanced to the to-be-formed part and quickly retracted from the formed part by use of the second motor 14, yet the high-force conditions (e.g., 100 tons, 125, ton, 150 tons, 200 tons, 300 tons, 400 tons) required to form the part can still be accomplished by the first motor 12. In one embodiment for a 100-ton press, the second motor 14 can operate at about 1500 RPMs with a gear reduction of 3:1 to produce an output of about 500 RPMs. The first motor 12 also operates at about 1500 RPMs with a gear reduction of 25:1 to produce an output of about 60 RPMs. The actuator screws 21, 25 may have a lead in the range of about 12 mm per revolution to about 30 mm per revolution (such as about 25 mm (about 1 inch) per revolution), which dictates the linear velocity of the two male-female thread mechanisms of the actuator 20. In one embodiment, the press ram 32 and upper tool 42 move at about 500 inches per minute when the second motor 14 is in operation and at about 60 inches per minute when the first motor 12 is in operation. In some embodiments, the second motor 14 includes a gear reduction in the range of 2:1 to 5:1. In some embodiments, the first motor 12 has a gear reduction in the range of 15:1 to 35:1.

Because the first and second motors 12 and 14 independently drive the two male-female threaded mechanisms of the linear actuator 20, they can be different motors for producing the desired result on the actuator 20 (i.e., high-linear speed and low-force conditions, or low-linear speed and high-force conditions). And because the press machine 10 allows one motor to be decoupled from the other motor (i.e., one motor rotates while the other motor is still), the possibility of one motor producing an undesirable condition on the other motor (e.g., RPM outside the other motor's limits) or on other parts associated with the other motor (e.g., the pulley systems) is eliminated. One novel aspect of this press machine 10 is that the second motor 14 moves with the platform 29 (i.e., the second motor 14 moves vertically relative to the first motor 12, as it rides along the platform 29) such that the second motor 14 remains in close proximity to the lower tube 26 and the lower nut 27 that it is controlling during operation, thereby limiting the size and weight of the various linkages (e.g., shafts, gears, pulleys, etc.) to these components that it drives.

Though the press machine 10 has been described by operation relative to a single actuator 20 that is driven by two motors 12 and 14, the present invention contemplates a linear press with multiple actuators 20 driving a single press ram 32 and upper tool 42, in which each of the multiple actuators 20 is associated with a pair of motors and the telescopic upper and lower tubes 24, 26. In such a design for a linear press, more force can be transferred to the upper tool 42 by multiple actuators 20, leading to more force for forming the part by use of the multiple actuators 20 acting in parallel. The present invention also contemplates a linear press in which the high-linear speed condition is produced by a single motor (in the position of the second motor 14) that drives the platform 29 downwardly with a high speed by providing power to multiple lower roller nuts 27 on the platform 29, but has multiple upper motors that produce the high-force conditions in parallel, driving multiple actuators 20 acting on the press ram 32. Further, the present invention contemplates multiple actuators 20 in which one actuator 20 includes a first motor for operation in the low-speed/high-force mode and a second motor for operation in the high-speed/low-force mode, and one or more additional actuators 20 having a motor for operation in the low-speed/high-force mode to deliver additional force as the part is being formed by the tool on the press ram 32. In such a system, the one actuator 20 may include a clutch that limits the rotational speed of the low-speed/high-force motors when advancing and retracting the press ram 32 in the high-speed/low-force mode so as to ensure the low-speed/high-force motors are not damaged by the high speeds.

Figure 5:
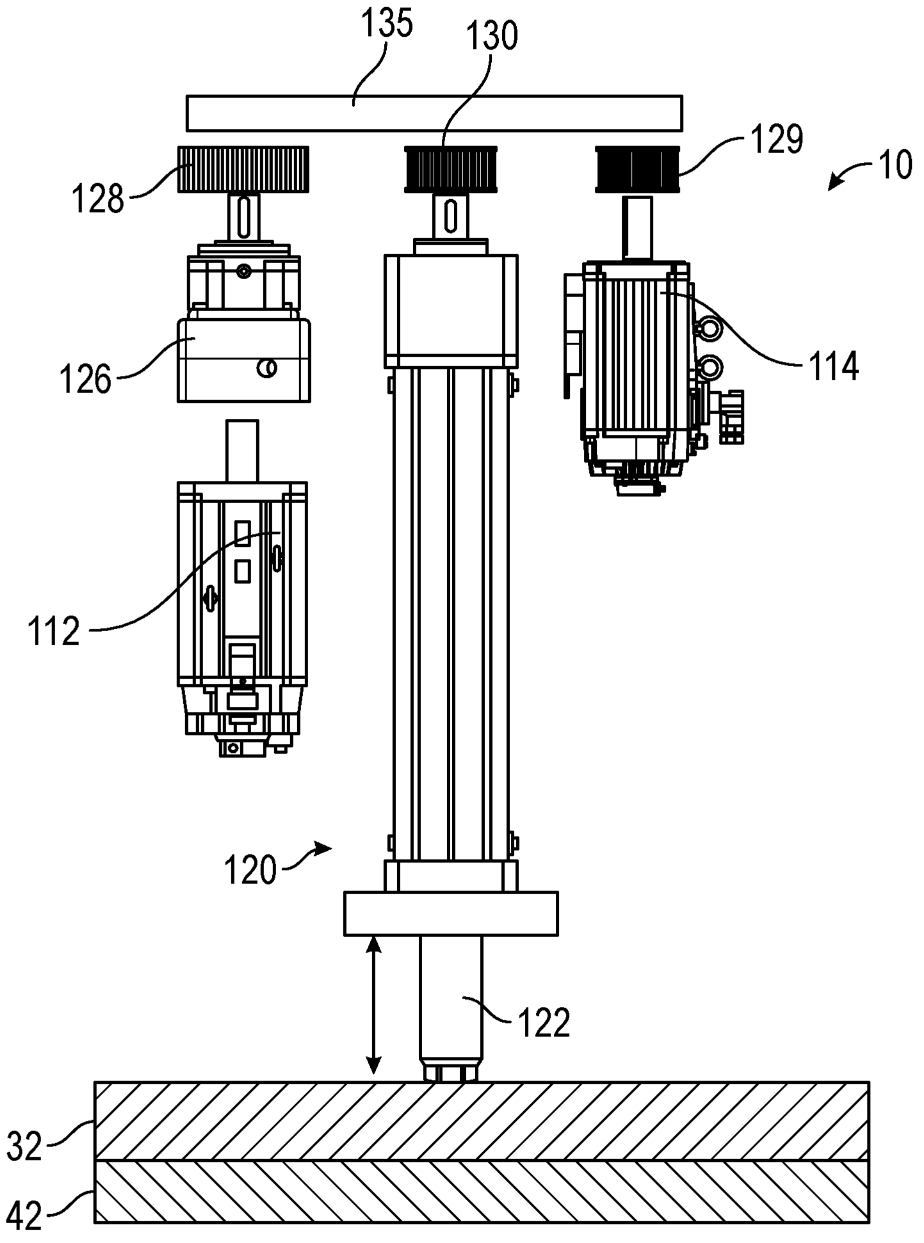
FIG. 5 illustrates the side view of an alternative embodiment of a linear-actuated press in which the press ram is moved by two motors linked to a single male-female threaded mechanism within the actuator.

FIG. 5 illustrates the side view of an alternative embodiment of an actuator 120 for a linear-actuated press machine 10 in which the press ram 32 and the upper tool 42 are moved by a first motor 112 producing high-force conditions and a second motor 114 for producing high-speed conditions. Like the previous embodiments, each of the motors 112, 114 is capable of delivering a variable speed to actuator 120 and the actuator 120 is a screw-driven linear actuator, which includes either a rotating screw and a non-rotating nut that vertically moves, or a fixed screw and a rotating nut that vertically moves (e.g., as described above in the embodiment of FIGS. 1-4). The actuator 120 includes an actuator rod 122 that moves due to this male-female threaded connection and is coupled to the press ram 32.

The first motor 112 is coupled to a clutch 126, which is coupled to a high-torque synchronous sprocket 128. On the other hand, the second motor 114 is directly coupled to a high-speed synchronous sprocket 129. The rotating portion of the male-female threaded connection of the actuator 120 is coupled to a synchronous drive sprocket 130. A synchronous belt 135 is coupled to all three sprockets 128, 129, 130, such that all three sprockets 128, 129, 130 are rotating in the same direction together. The three sprockets 128, 129, 130 may have different sizes, depending on the gear reduction desired among them.

In the embodiment of FIG. 5, the linear force and linear speed of the press ram 32 is controlled by the operation of the first motor 112 and the second motor 114. During the downward advancement stroke when the press ram 32 and the attached upper tool 42 are moving toward the to-be formed part, the linear motion of the press ram 32 is preferably high speed since no force is yet needed for forming at this point. This is accomplished by operating the second motor 114 that drives the high-speed sprocket 129, which thereby provides the driving force for the drive sprocket 130 and the screw-driven mechanism of the actuator 120 via the belt 135, causing a high-speed movement of the actuator rod 122. However, the high rotational speeds created by the second motor 114 would be too fast for the high-force motor 112. Thus, the corresponding movement in the high-torque sprocket 128 in the high-linear speed condition from the second motor 114 in the actuator 120 is received by the clutch 126, which spins without transferring the high rotational speeds to the shaft of the first motor 112. In other words, the clutch 126 at least partially or fully disengages the shaft of the first motor 112 when the second motor 114 is operational.

When the upper tool 42 begins to engage the part that must be formed in the press 10, more force is needed. In this working stroke, the second motor 114 stops operational as the first motor 112 becomes operational. When this occurs, the clutch 126 is fully engaged to the first motor 112, causing the high drive torque from the first motor 112 to be transferred to the high-torque sprocket 128, which is then transferred to the drive sprocket 130 of the actuator 120. Thus, the actuator rod 122 advances downwardly at a lower speed, but with high force, to form the part. In the high-torque condition, the rotation of the high-speed sprocket 129 still occurs via the belt 135, but it is less rotational speed than when the second motor 114 is in operation. Thus, the second motor 114 is being driven by the first motor 112 at the speed chosen for the first motor 112. Of course, it is also possible to add more torque by powering the second motor 114 at the same speed dictated by the first motor 112 when forming the part.

In one embodiment for the press machine 110 of FIG. 5, the second motor 114 operates at about 1500 RPMs with a sprocket reduction of 3:1 to produce an input of 500 RPMs at the threaded-screw mechanism of the actuator 120. The first motor 112 also operates at about 1500 RPMs with a gear reduction of 25:1 to produce an input of 60 RPMs at the threaded-screw mechanism of the actuator 120. In some embodiments, the second motor 114 includes a sprocket gear reduction in the range of 2:1 to 5:1. In some embodiments, the first motor 112 has a sprocket gear reduction in the range of 15:1 to 35:1. Though each motor 112, 114 can spin at 1500 RPMs, due to the gear reduction ratios, rotating the second motor 114 at high levels (e.g., 1500 RPM) would cause the first motor 120 to rotate at much higher RPM levels (e.g., at 12,500 RPM) if the clutch 126 were not present, which would cause damage to the first motor 120.

The actuator screw (not shown) in the actuator 120 of FIG. 5 may have a lead in the range of about 12 mm per revolution to about 30 mm per revolution (such as about 25 mm (about 1 inch) per revolution), which dictates the linear velocity of the male-female thread mechanisms of the actuator 120. In one embodiment, the moving upper tool 42 moves at about 500 inches per minute when the second motor 114 is in operation and at about 60 inches per minute when the first motor 112 is in operation. The clutch 126 may be, for example, an air clutch although other type of clutches may be suitable. Because the first and second motors 112 and 114 separately drive the male-female threaded mechanism of the linear actuator 120, they can be different motors for producing the desired result on the actuator 120 (i.e., high-linear speed and low-force conditions, or low-linear speed and high-force conditions).

Figure 6:
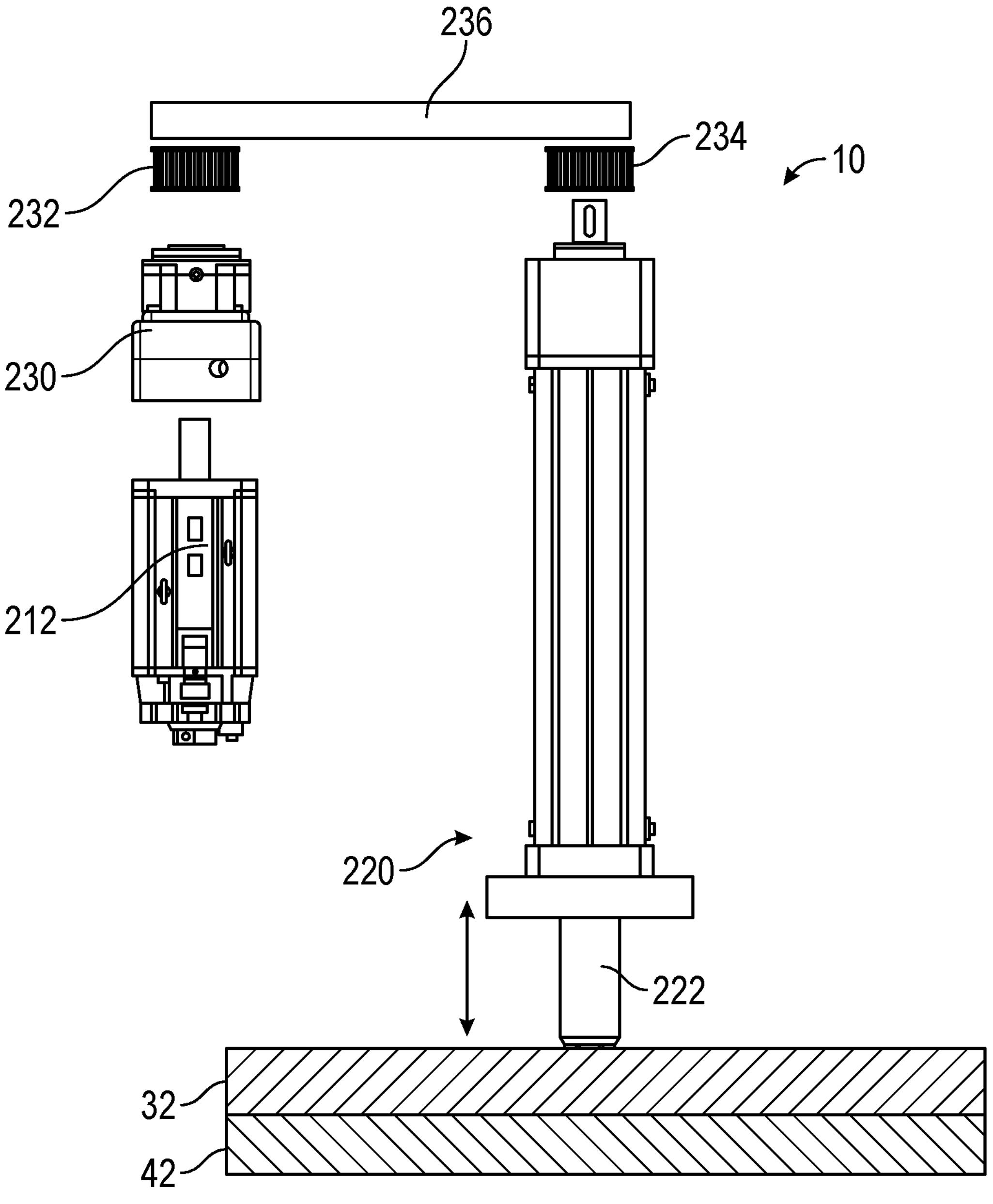
FIG. 6 illustrates the side view of another alternative embodiment of a linear-actuated press in which the press ram is moved by a single motor linked to a single male-female threaded mechanism within the actuator.
Figure 7A:
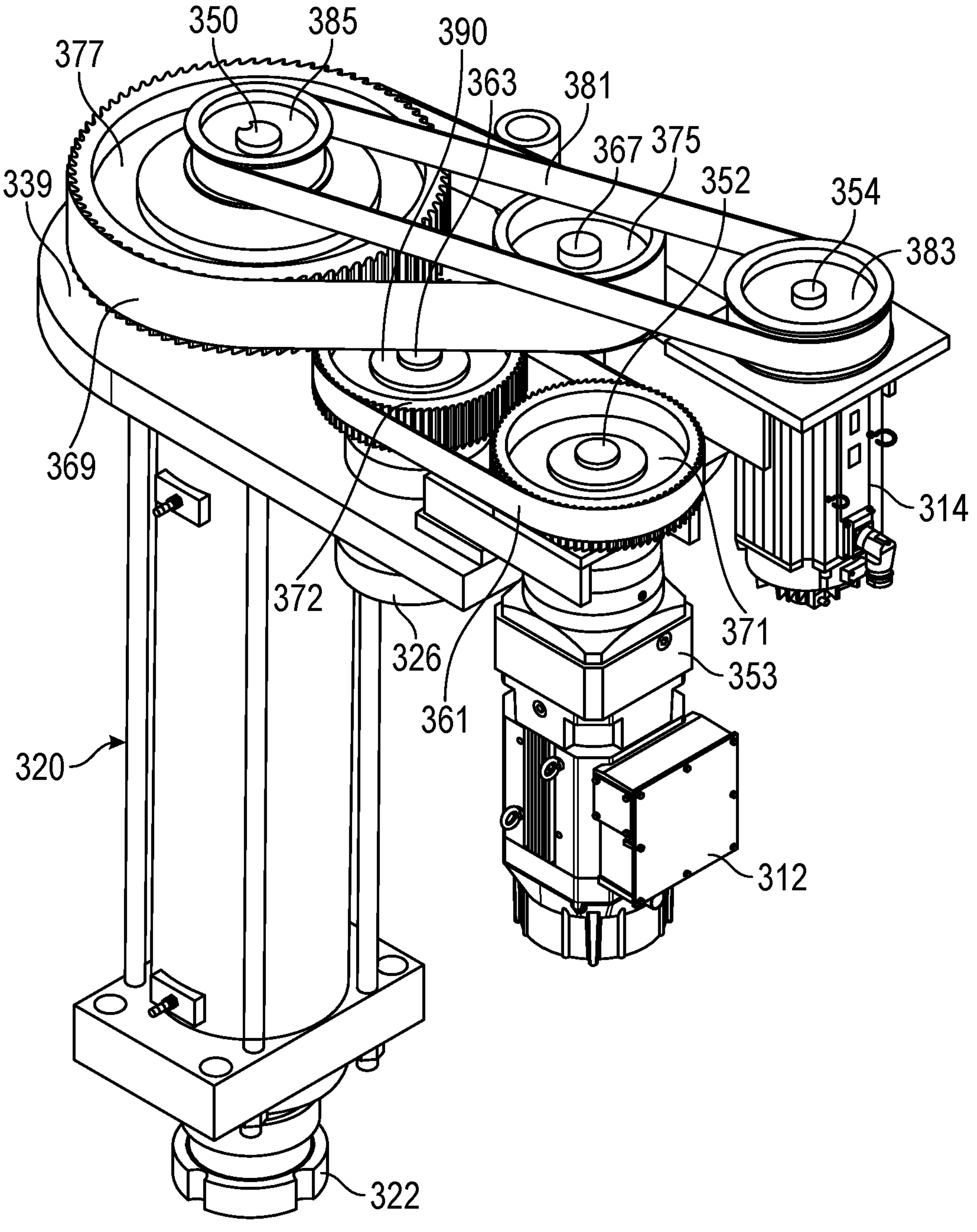
FIG. 7A is a perspective view of an alternative linear actuator having two motors and a clutch system.
Figure 7B:
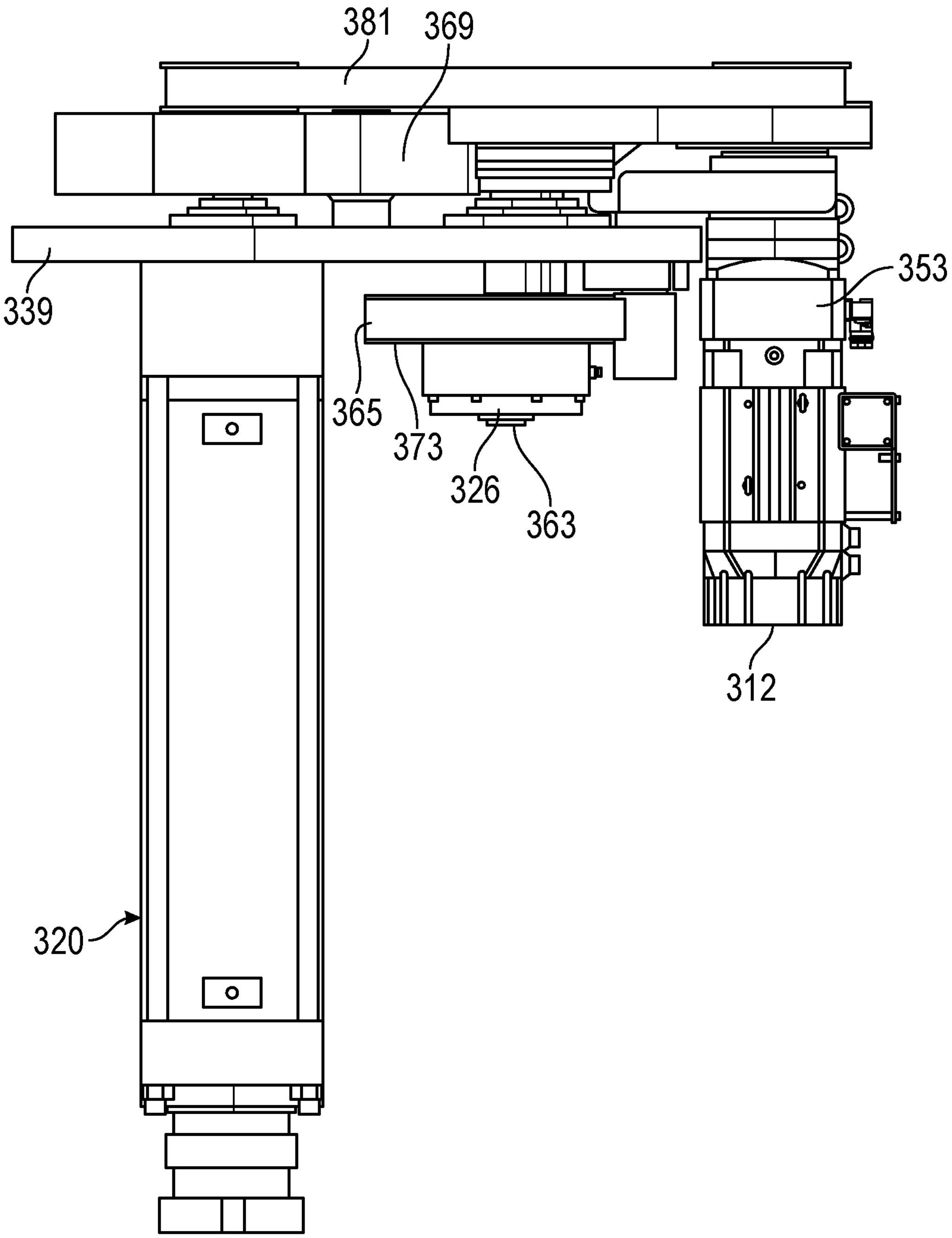
FIG. 7B is a side view of the alternative linear actuator of FIG. 7A.
Figure 7C:
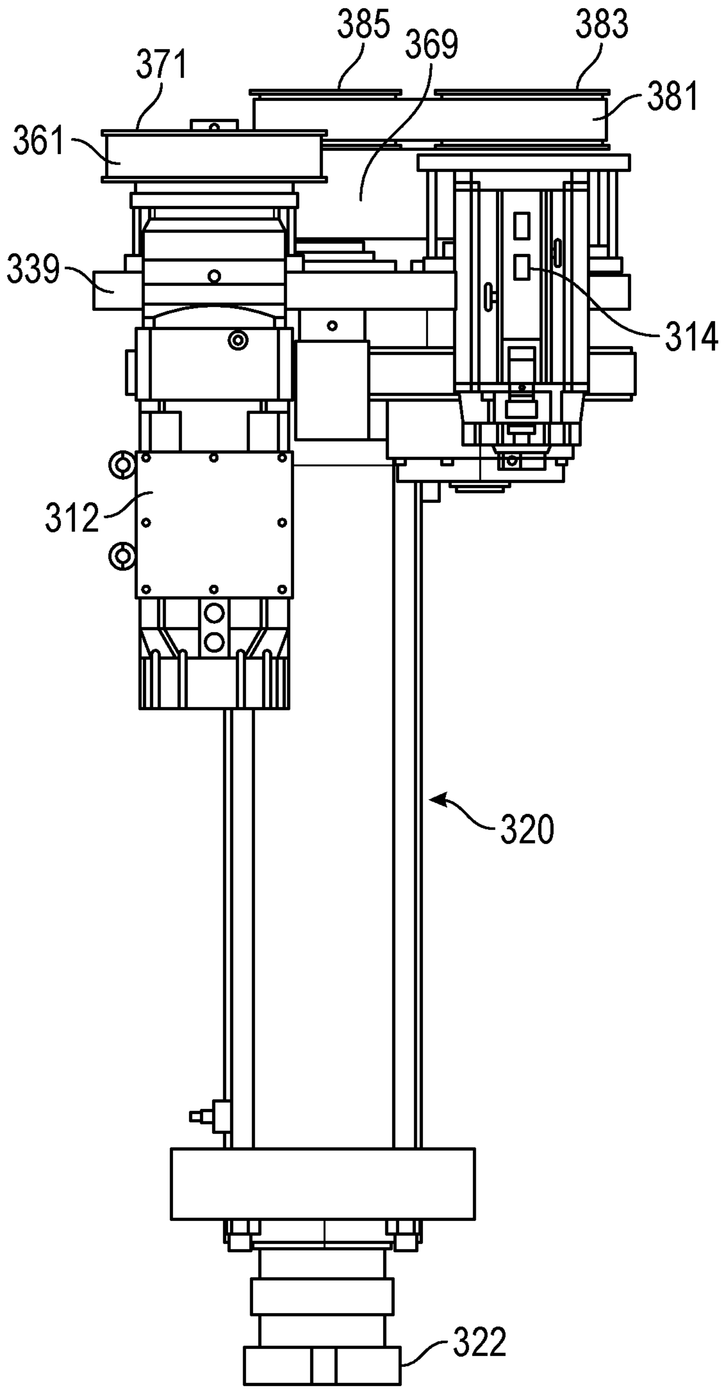
FIG. 7C is an end view of the alternative linear actuator of FIG. 7A.
Figure 7D:
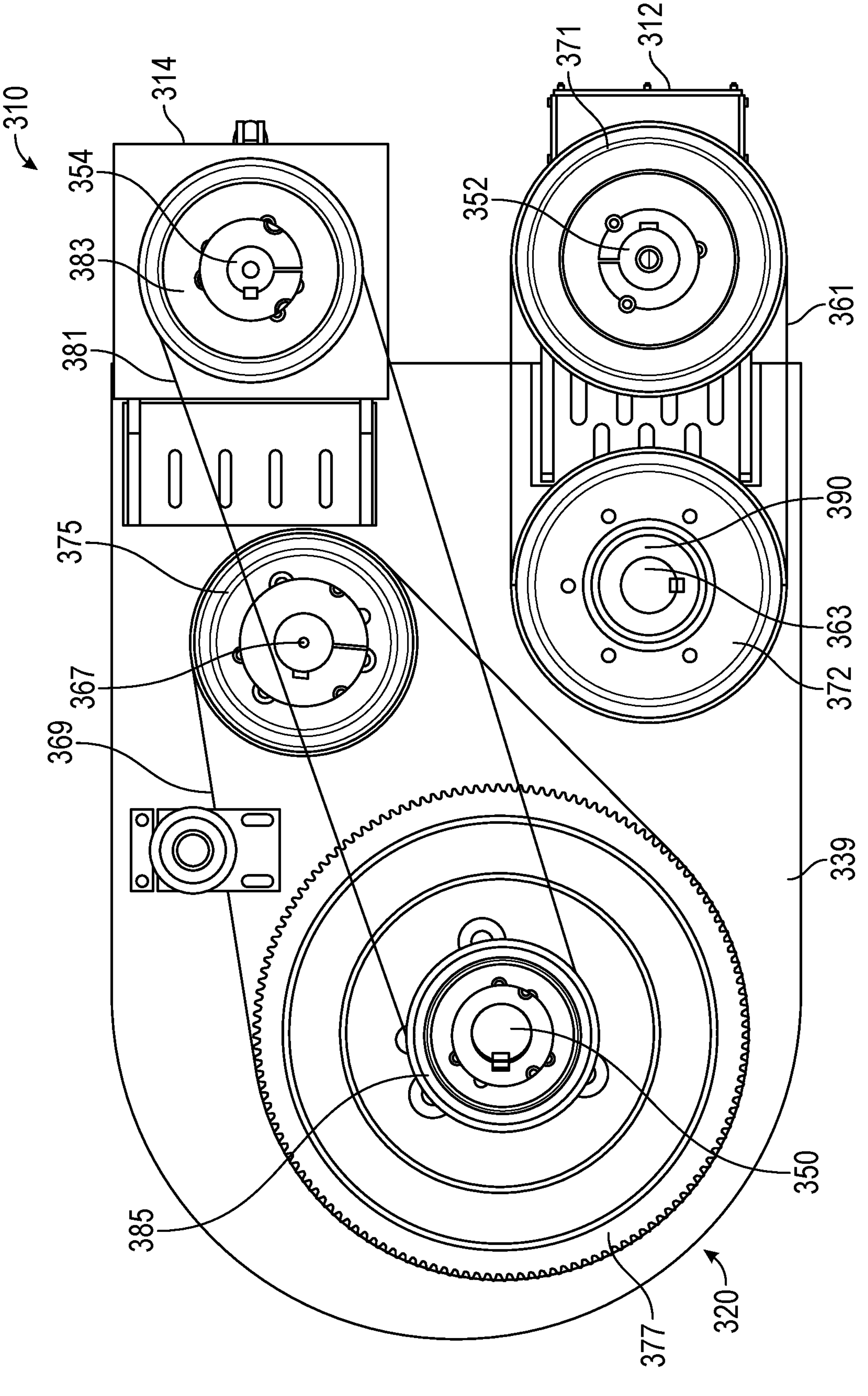
FIG. 7D is a top view of the alternative linear actuator of FIG. 7A.
Figure 7E:
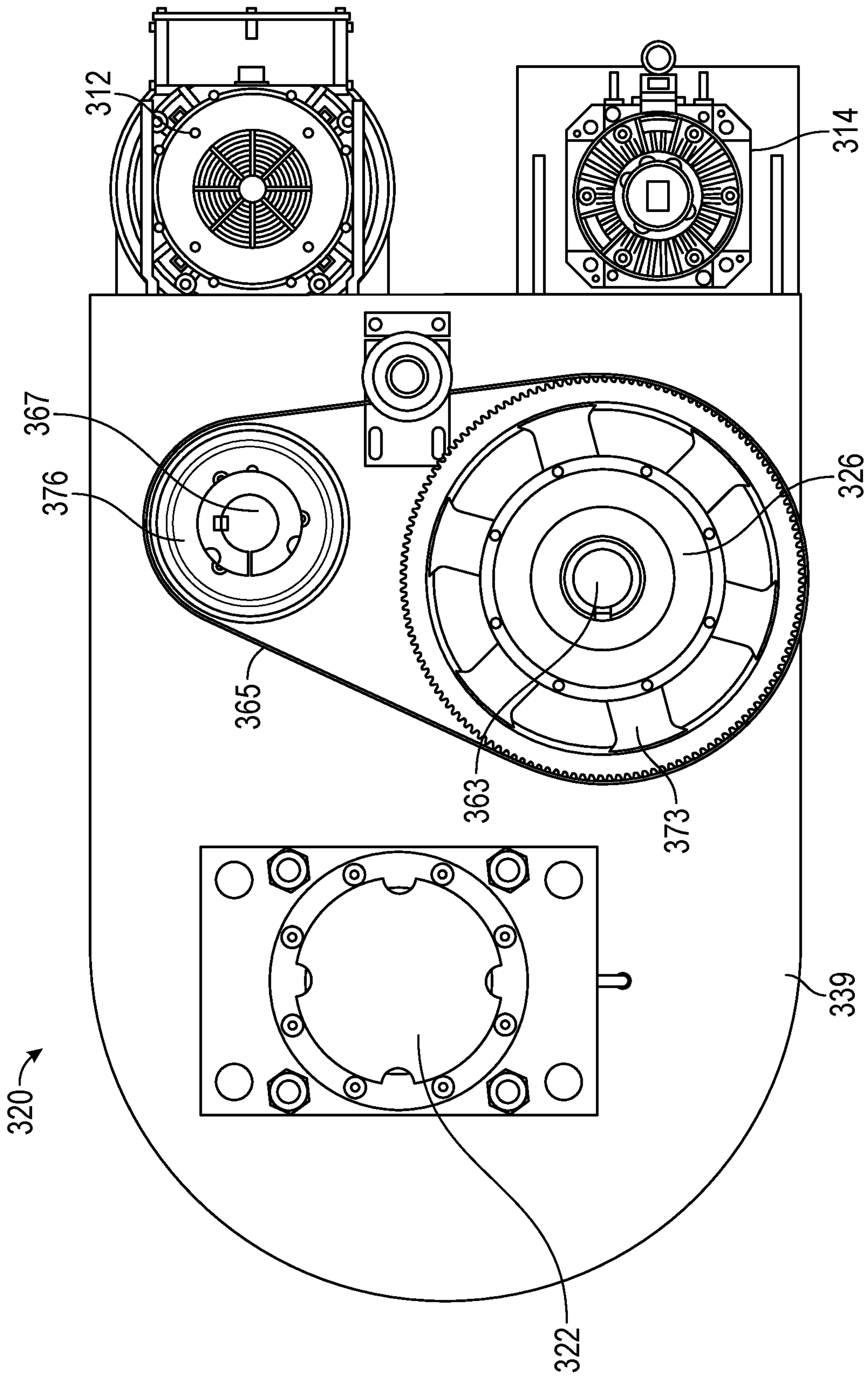
FIG. 7E is a bottom view of the alternative linear actuator of FIG. 7A.

FIG. 6 illustrates the side view of another alternative actuator 220 of a press machine 10 in which the press ram 32 is moved by a single motor 212 linked to a single male-female threaded mechanism within the screw-driven linear actuator 220. The motor 212 has a shaft that is linked to a multi-speed gearbox 230 that has an output shaft that drives a synchronous sprocket 232. The synchronous sprocket 232 is coupled to another synchronous drive sprocket 234 for the actuator 220 via a synchronous belt 236. The rotating portion of the male-female threaded connection of the actuator 220 is coupled to a synchronous drive sprocket 234.

In the embodiment of FIG. 6, the linear force and linear speed of the press ram 32 is controlled by the operation of only the first motor 212. During the downward advancement stroke when the press ram 32 and the upper tool 42 are moving toward the to-be formed part, the linear motion of the press ram 32 is preferably high since no force is yet needed for forming at this point. This is accomplished by operating the first motor 212 at a gear ratio, as dictated by the gearbox 230, that drives the sprocket 232 at a high speed, thereby causing a high linear-speed movement of the actuator rod 222 via the drive sprocket 234 of the actuator 220 and the belt 236. When the upper tool 42 begins to engage the part that must be formed, more force is needed. In this working stroke, the first motor 212 switches to a lower speed and the multi-speed gearbox 230 switches to a different gear needed to provide higher drive torque at the sprocket 232, which is then transferred to the drive sprocket 234 of the actuator 220. The multi-speed gearbox 230 includes an internal clutch to help switch between the gears. Thus, the actuator rod 222 advances downwardly at a lower speed, but with high torque, to form the part. When the part is fully formed, the motor 212 operates in the reverse direction and with a higher speed to retract the press ram 32 and the upper tool 42 from the formed part. In this retraction part of the cycle, the multi-speed gearbox 230 again shifts gears to help provide a high linear speed retraction.

FIGS. 7A-7E illustrate an alternative linear actuator 320 that is similar to the linear actuator 120 of FIG. 5 that included the clutch 126. The linear actuator 320 includes a first motor 312 and a second motor 314 that drive a ram for a press machine (exemplary press machines 400, 500, and 600 are shown in more detail in FIGS. 8-10 below), and a clutch 326 to protect the high-torque first motor 312 from the high rotational speeds that could otherwise damage the first motor 312 when the second motor 314 is advancing and retracting the press ram from the part.

Like the previous embodiments, the linear actuator 320 is preferably a screw-driven linear actuator that includes either a rotating screw and a non-rotating nut that vertically moves an actuator rod 322, or a fixed screw and a rotating nut that vertically moves the actuator rod 322 (e.g., as described above in the embodiment of FIGS. 1-4). The actuator 320 moves the actuator rod 322 due to the first motor 312 and the second motor 314 driving this male-female threaded connection via an actuator input shaft 350 that is coupled to the male-female threaded connection of the actuator 320. The first motor 312 causes the actuator rod 322 to linearly move at a lower speed, but with a high force for forming the part in the press machine. The second motor 314 causes the actuator rod 322 to linearly move at a high speed, but with a lower force for advancing and retracting the press ram relative to the part when little force is needed (other than to move the weight of the press ram). In the illustrated embodiment, a platform 339 is used to mount various parts of the actuator 320, the first motor 312, the second motor 314, and the belt system, which is described in more detail below.

The actuator input shaft 350 is driven by a belt system that includes a first belt system coupling the actuator input shaft 350 and a first motor drive shaft 352, and a second belt system coupling the actuator input shaft 350 and a second motor drive shaft 354. The first and second belt systems can include belts and various pulleys and/or sprockets that drive or are driven by the belts. As used in this patent application, the term "sprocket" includes both traditional sprockets with teeth that engage a chain or belt, pulley sprockets that resemble pulleys but have smaller radially extending projections (e.g., small teeth) for engaging grooves within a belt (e.g., synchronous timing belts), and also pulleys with a smooth surface for engaging a smooth belt. The skilled artisan will understand that these various types of pulleys and sprockets are circular driving mechanisms that can be interchanged in many arrangements.

In one illustrated embodiment, the first belt system includes a first belt 361 coupling the first motor drive shaft 352 and a first intermediate shaft 363, and a second belt 365 (FIGS. 7B and 7E) coupling the first intermediate shaft 363 and a second intermediate shaft 367. A third belt 369 couples the second intermediate shaft 367 to the actuator input shaft 350. Each of the shafts 352, 363, 367, 350 is associated with a circular driving mechanism to receive and rotate with the first belt 361, the second belt 365, and the third belt 369.

In the illustrated embodiment of FIGS. 7A-7E, the first motor shaft 352 is associated a first motor sprocket 371. The first intermediate shaft 363 is associated with a first intermediate top sprocket 372 for engaging the first belt 361, and a first intermediate bottom sprocket 373 (FIGS. 7B and 7E) for engaging the second belt 365. The terms "top" and "bottom" are used to indicate the location relative to the platform 339. The second intermediate shaft 367 is associated with a second intermediate top sprocket 375 for engaging the third belt 369, and a second intermediate bottom sprocket 376 (FIG. 7E) for engaging the second belt 365.

Lastly, the actuator input shaft 350 is associated with a circular driving mechanism, which is a first actuator sprocket 377 that is driven by the third belt 369. The ratio of the diameters of the pulleys and/or sprockets in the first belt system dictate the transfer of speed and torque from the first motor shaft 352 to the actuator input shaft 350. In one embodiment, the first motor shaft 352 rotates at a speed of about 250 RPM and delivers about 1050 Nm of torque, causing the actuator input shaft 350 to rotate at a speed of about 50 RPM and delivers about 5200 Nm of torque. As such, in this embodiment, the torque output from the first motor shaft 352 is increased by the first belt system by about a factor of 5 relative to the torque at the actuator input shaft 350 that ultimately drives the actuator rod 322. The present invention contemplates the first belt system increasing the torque output from the first motor shaft 352 to the actuator input shaft 350 in the range of 3 to 7. Furthermore, the first motor 312 may optionally be coupled to the first motor shaft 352 by a gear box 353 (FIGS. 7A-7B) that reduces the rotational speed from the first motor 312, but increases torque. In this embodiment, the combination of the gear box 353 and the first belt system work together to convert the power from the first motor 312 to the desired high torque level (and less rotational speed) at the actuator input shaft 350 that is necessary to form the part. The rotational-speed reduction from the gear box 353 can be by a factor in the range from 3 to 10, such as gear-box reduction by a factor of 7. Although the first belt system of the illustrated embodiment includes three belts 361, 365, 369 and two intermediate shafts 363, 367, other configurations for the first belt system are available as well.

By use of the first intermediate shaft 363 and the second intermediate shaft 367 in the first belt system, the drive system associated with the first motor 312 can include additional components for enhancing performance of and protecting the first motor 312. Specifically, the clutch 326 is mounted on the first intermediate shaft 363 below the platform 339 and limits the rotational speed of the first intermediate top sprocket 372, which, in turn, limits the rotational speed of the first motor 312 via the first belt 361. The clutch 326 is preferably a bi-directional clutch such that it can limit the rotational speed of the first motor 312 when necessary. During the high-speed low-force linear movement of the second motor 314 to advance or retract the press ram relative to the part, the clutch 326 is at least partially disengaged from the first motor 312 to maintain a rotational speed of the first motor shaft 352 and, hence, the first motor 312 below a limit to reduce possible damage to the first motor 312. However, when the part is being formed during the low-speed high-force linear movement of the press ram caused by the first motor 312, the clutch 326 is fully engaged to the first motor 312 to transfer high torque from the first motor 312 to the linear actuator 320 via the first belt system.

The first belt system may optionally include a torque limiter 390 that is also associated with the first intermediate shaft 363. The purpose of the torque limiter 390 is to mechanically limit the maximum torque transferred into the male-female threaded mechanism to protect the screw, the nut, the bearings, and associated power transmission components from unanticipated events. Errors in tooling set up or product loading can result in the press ram and tool making contact with the work piece before the programmable controller begins ramping down the speed from the second motor 314, resulting in undesirable forces being experienced throughout the system.

The second belt system in FIGS. 7A-7E includes a second-motor belt 381 that directly couples the second motor drive shaft 354 and the actuator input shaft 350. Unlike the first belt system, there are no intermediate shafts that rotate when the second motor 314 is driving the actuator 320. As shown, the second-motor belt 381 engages a second-motor pulley 383 associated with the second motor drive shaft 354 and an actuator pulley 385 associated with the actuator input shaft 350. As the second motor 314 is used for the high-speed, low-force movement of the actuator rod 322 and press ram coupled thereto, the ratio of the diameters of second-motor pulley 383 and the actuator pulley 385 dictates the speed of the actuator input shaft 350 relative to the second motor drive shaft 354. In one embodiment, the ratio of the diameter of second-motor pulley 383 to the diameter of the actuator pulley 385 is in the range from about 2:1 to about 3:1.

Because the actuator input shaft 350 has the actuator pulley/sprocket 385 that is driven by the second motor 314 and the first actuator sprocket 377 that is driven by the first motor 312, the drive function of either motor 312, 314 results in rotation of the motor input shaft of the other motor. Hence, the clutch 326 limits the rotational speed of the first motor 312 when the second motor 314 is driving the actuator 320 at a high rotational speed. On the other hand, when the actuator 320 is driven by the first motor 312, the actuator pulley/sprocket 385 is still rotating the second-motor belt 381, which causes the second motor 314 to also rotate. Thus, the second motor 314 is preferably operational to deliver some smaller amount of additive torque when the first motor 312 is powered in the working stroke of the cycle when the part is being formed.

Figure 8:
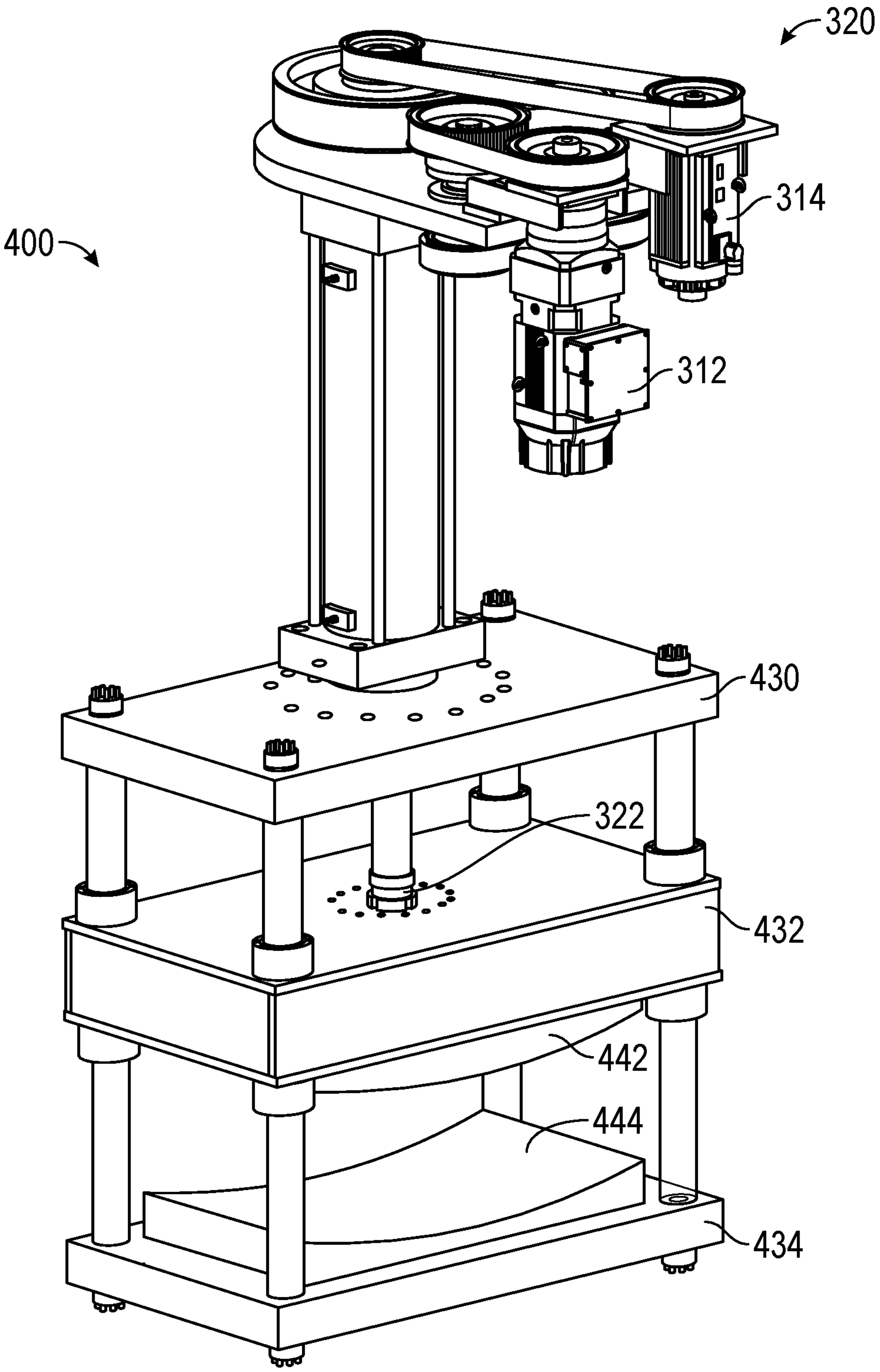
FIG. 8 is a perspective view of a four-post press machine that is driven by the linear actuator of FIG. 7.

FIG. 8 illustrates the actuator 320 of FIG. 7 within a four-post press 400. The actuator 320 is mounted to the stationary press crown 430 and the actuator rod 322 is mounted to the press ram 432. The press ram 432 moves under the power of the actuator rod 322 to and from the press base 434 based on the outputs of the first motor 312 and second motor 314, as described above relative to FIG. 7. The press ram 432 holds an upper tool 442 and the press base 434 holds a lower tool 444. A part is formed by the four-post press 400 between the upper tool 442 and lower tool 444. As shown, the upper tool 442 and lower tool 444 are for forming a curved sheet-metal part, but a variety of different forming, cutting, and punching tools can be applied to the press 400. The press machine 400 may include a brake to hold the position of the press ram 432 when the press machine 400 is powered down or at a steady state.

When the part is being formed during the low-speed, high-force stroke of the cycle, both of the first motor 312 and the second motor 314 are rotating as the low-speed, high-force first motor 312 provides power to the actuator 320 because there is no clutch or mechanism to disconnect the second motor 314 from the actuator 320. In other words, while the actuator 320 is being powered by the first motor 312, the second-motor belt 381 is still turning due to the rotation of the actuator sprocket or sprocket 385 (see FIGS. 7A and 7D), which causes the second motor 314 to rotate. As such, during the low-speed, high-force stroke of the cycle, the second motor 314 is preferably operational to provide torque (albeit a smaller amount of torque relative to the torque provided by the first motor 312) such that the torque of the high-speed, low-force second motor 314 is additive to the torque of the low-speed, high-force first motor 312.

Figure 9A:
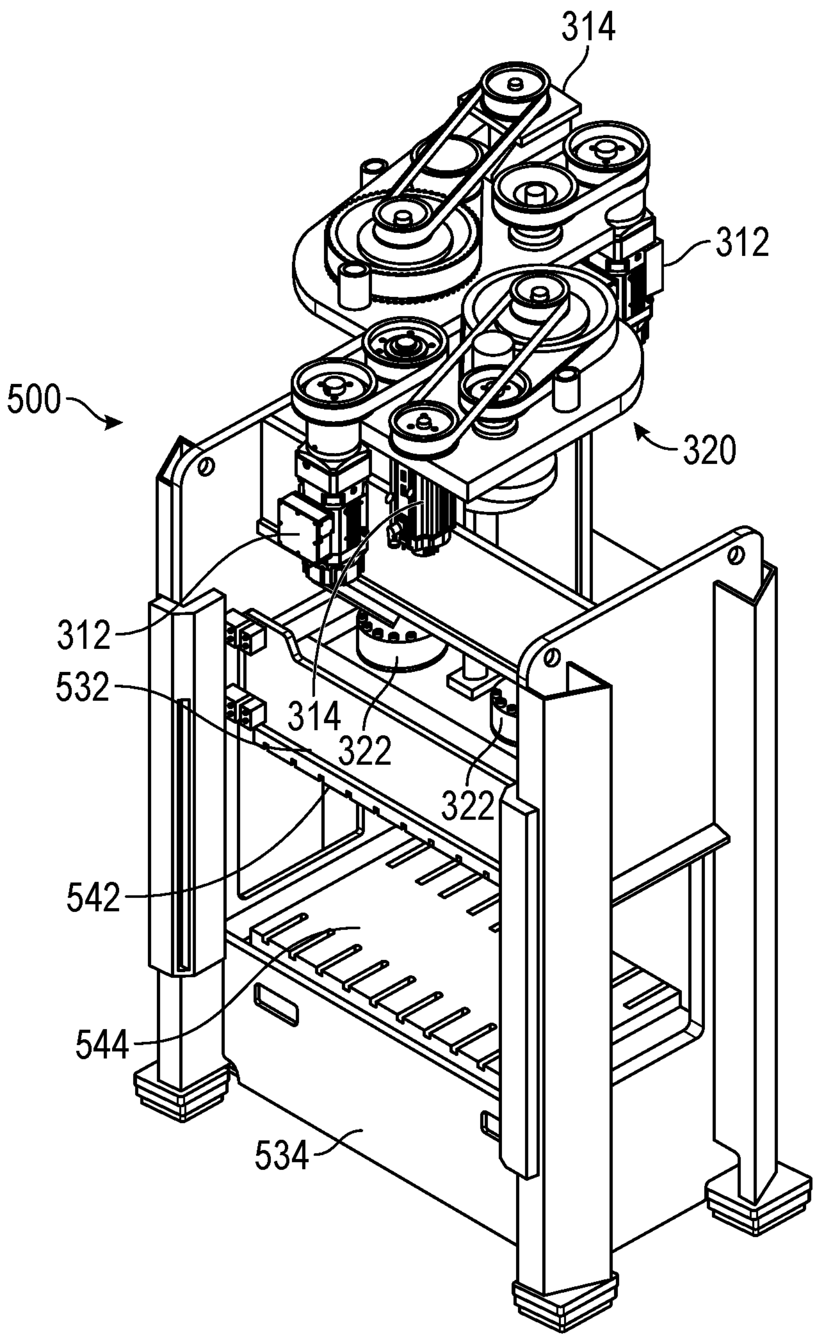
FIG. 9A is a perspective view of a gib-style press machine that is driven by multiple linear actuators illustrated in FIG. 7.
Figure 9B:
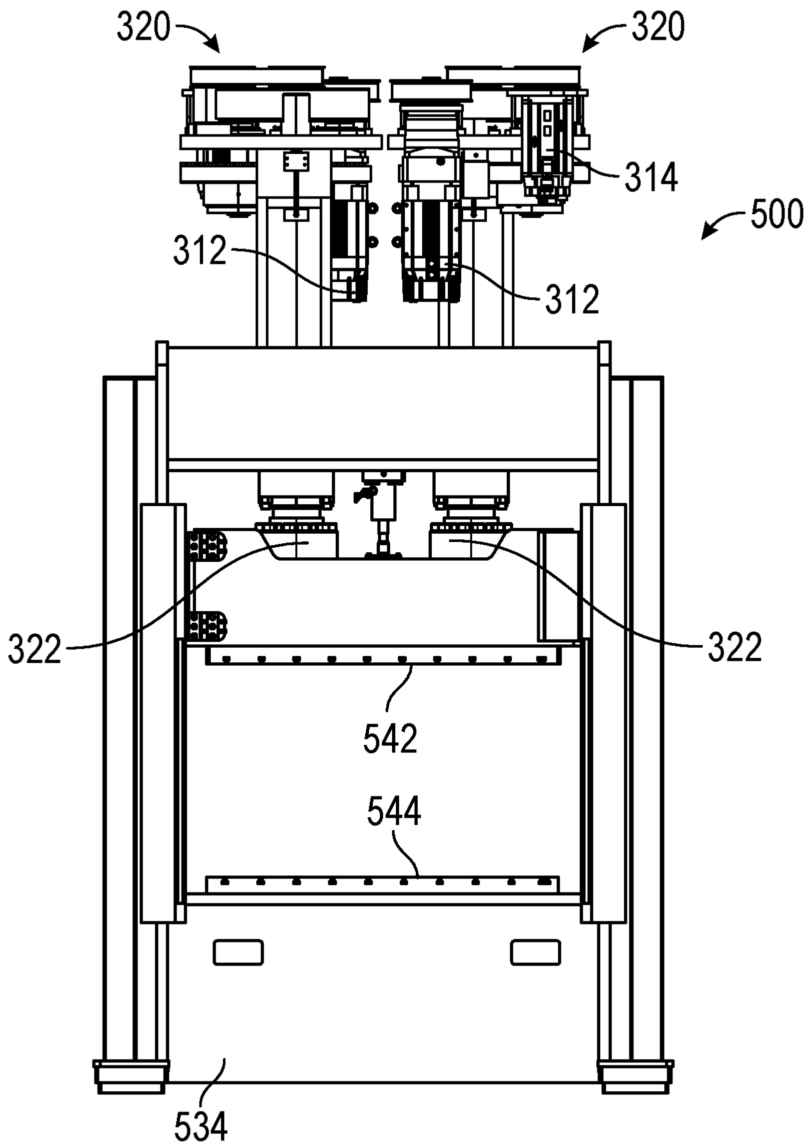
FIG. 9B is a side view of the gib-style press machine of FIG. 9A.

FIGS. 9A and 9B illustrate the use of two linear actuators 320 in a gib-style press machine 500. Instead of sliding on posts, the press ram 532 moves along gibs (e.g., wedge-shaped gibs) located within the frame of the press machine 500. The gibs precisely guide the reciprocating motion of the press ram 532 toward and away from the base 534. The linear actuators 320 are mounted to the frame so as to remain stationary while the actuator rods 322 are mounted to and move the press ram 532. An upper tool 542 and a lower tool 544 are mounted, respectively, to the press ram 532 and the press base 534. By using two actuators 320 in parallel, the amount of force on the press ram 532 produced by the first motors 312 can be doubled so as to provide extra force that is necessary to form the parts by the tools 542, 544. Further, the high-speed movement of the press ram 532 in the advancement stroke and the retraction stroke is brought about by the synchronous operation of the second motors 314 on both of the linear actuators 320.

Figure 10:
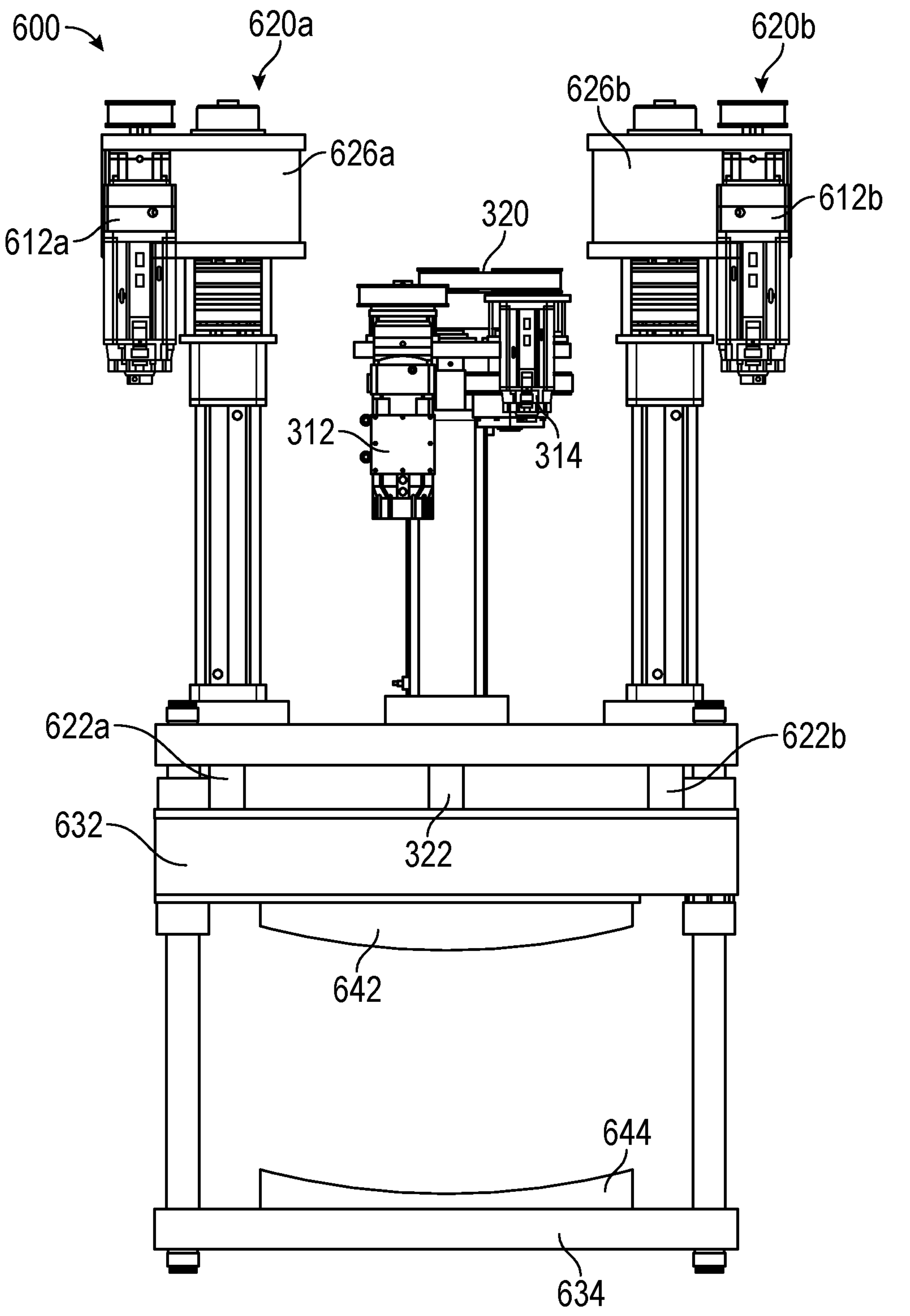
FIG. 10 is a perspective view of a press machine that is driven by the single linear actuator illustrated in FIG. 7 and multiple high-force, low speed linear actuators.

FIG. 10 illustrates alternative post-style press machine 600 using multiple linear actuators 320, 620*a*, 620*b*. The middle linear actuator 320 (described in detail relative to FIG. 7) includes the first motor 312 for delivering high force to the press ram 632 when forming a part, and the second motor 314 for delivering high speed to the press ram 632 in the advancement and retraction strokes. The other two linear actuators 620*a*, 620*b* in the press machine 600 include only a first motor 612*a*, 612*b* that delivers high force to the press ram 632 when the part is being formed. Consequently, the press ram 632 moves at a high speed relative to the base 634 in the advancement and retraction strokes under the power of only the second motor 314 of the middle linear actuator 320. When that high-speed condition occurs, the first motors 612*a*, 612*b* of the other two linear actuators 620*a*, 620*b* are protected from high speed conditions by use of clutches 626*a*, 626*b*, which operate in the same manner as the clutch 326 described relative to the actuator 320 in FIG. 7. The clutches 626*a*, 626*b* are coupled to the output shaft of the first motors 612*a*, 612*b* either directly or indirectly, such as through an intermediate shaft that is driven by the first motors 612*a*, 612*b* via a belt. When the part is being formed by the tools 642, 644 and higher force is needed, the first motors 612*a*, 612*b* are operational and the clutches 626*a*, 626*b* engage to permit the torque to be transferred to the first male-female thread mechanism of the linear actuators 620*a*, 620*b*. The high torque from the first motors 612*a*, 612*b* is converted to a high force by the first male-female thread mechanism and transferred to the actuators rods 622*a*, 622*b*, which drive the press ram 632. At the same time, the first motor 312 of the middle linear actuator is also delivering high force to the press ram 632. The embodiment of the press machine 600 of FIG. 10 may allow for forces in excess of 300 tons (e.g., more than 100 tons delivered per actuator 320, 620*a*, 620*b*) when needed, but lesser force amounts can be delivered by powering the three first motors 312. 612*a*, 612*b* at lower levels to produce less torque.

FIGS. 11A-11D illustrate an alternative linear actuator 720 that is similar to the linear actuator 120 of FIG. 5 and the linear actuator 321 of FIG. 7. The linear actuator 720 includes a first motor 712 and a second motor 714 that drive a ram for a press machine in the same manner and configurations described in the exemplary press machines 400, 500, and 600 of FIGS. 8-10. The linear actuator 720 includes a clutch 726 (FIGS. 11B and 11D) to protect the high-torque first motor 712 from the high rotational speeds that could otherwise damage the first motor 712 when the second motor 714 is advancing and retracting the press ram from the part.

The first motor 712 and the second motor 714 cause the rotation of an actuator input shaft 730 via a first actuator sprocket 731 and a second actuator sprocket 732, respectively. A first belt system couples the first motor 712 and the first actuator sprocket 720 and includes a first belt 741 and a second belt 743. The first belt 741 engages a first motor sprocket 733 and a bottom intermediate sprocket 735 (FIG. 11D) below a mounting platform 739 of the actuator 720. The second belt 743 engages a top intermediate sprocket 737 and the first actuator sprocket 731. The bottom intermediate sprocket 735 (FIG. 11D) and the top intermediate sprocket 737 are located on and rotate around an intermediate shaft 738. The clutch 726 is also coupled to the intermediate shaft 738 below the platform 739. In one embodiment, the first motor 712 rotates at a speed of about 250 RPM and delivers about 1050 Nm of torque, causing the actuator input shaft to rotate at a speed of 50 RPM and delivers about 5200 nm of torque. As such, in this embodiment, the torque output from the first motor shaft is increased by the first belt system by about a factor of 5 relative to the torque at the actuator input shaft that ultimately drives the actuator rod 722. The present invention contemplates the first belt system increasing the torque output from the first motor 712 to the actuator input shaft in the range of 3 to 7.

In another embodiment, the first motor 712 is optionally coupled to the first motor shaft 752 (FIG. 11D) by a gear box 753 (FIGS. 11A-11B) that reduces the rotational speed from the first motor 712, but increases torque. In this embodiment, the combination of the gear box 753 and the first belt system work together to convert the power from the first motor 712 to the desired high torque levels (and less rotational speed) at the actuator input shaft 730 that are necessary to form the part. The rotational-speed reduction from the gear box 753 can be by a factor in the range from 3 to 10, such as gear-box reduction by a factor of 7. The gear box 753 may include helical gears or planetary gears for the conversion.

The second motor 714 is directly coupled to the second actuator sprocket 732 by a single belt 745. The single belt 745 engages a second-motor sprocket (not shown) on the output shaft of the second motor 714. As the second motor 714 is used for the high-speed, low-force movement of the actuator rod 722 and the press ram that coupled to the rod 722, the ratio of the diameters of the second-motor sprocket and the second actuator sprocket 732 dictates the speed of the actuator input shaft relative to the second motor drive shaft. In one embodiment, the ratio of the diameter of second actuator sprocket 732 to the diameter of the second motor sprocket (mounted to the second motor 714, but not shown) is in the range from about 2:1 to about 3:1.

Because the actuator input shaft has the second actuator sprocket 732 that is driven by the second motor 714 and the first actuator sprocket 731 that is driven by the first motor 712, the drive function of either motor 712, 714 results in rotation of the motor input shaft of the other motor. Hence, the clutch 726 limits the rotational speed of the first motor 712 when the second motor 714 is driving the actuator 720 at a high rotational speed.

The actuator 720 is forced together between a top cap 760*a* and a bottom cap 760*b* by a plurality of tie rods 762. The bottom cap 760*b* includes a plurality of fastener openings 764 that allow the bottom cap 760*b* and, thus, the actuator 720 to be coupled to a stationary press crown 830 (FIG. 12) such that the moveable actuator rod 722 moves through the press crown 830 and drives a press ram 832 (FIG. 12). The top cap 760*a* is attached to the platform 739, which is the structure to which the motors 712, 714 and the intermediate shaft 738 are mounted. The motors 712, 714 may be mounted directly to the platform 739, or mounted indirectly to the platform 739 via a secondary structure that, itself, is mounted to the platform 739 (or that is integral with the platform 739). Thus, in the embodiment of FIG. 11, the motors 712, 714, the intermediate shaft 738, and the actuator 720 are mounted to the same platform 739, and the various sprockets and belts (which are coupled to the motors, 712, 714, the actuator 720, and the intermediate shaft 738) are rotating and moving relative to the platform 739.

To provide tension to the various belts that drive the actuator 720, the first motor 712 is mounted to the platform 739 via a plurality of slots 772 (FIG. 11D), allowing the first motor 712 to be positioned properly relative to the sprocket 735 during the mounting process. Similarly, the second motor 714 is mounted to the platform 739 via a plurality of slots 774 (FIG. 11C), allowing the second motor 714 to be positioned properly relative to the second actuator sprocket 732 during the mounting process. The slots 772 and 774 can be in the base plates of the motors 712, 714, or in the platform 739, or both. For the belt 743, which couples the first actuator sprocket 731 and the top intermediate sprocket 737, a belt tensioning device 736 (FIGS. 11A and 11C) provides tension to the belt 743 as it moves. Belt tensioning devices can be used on the other belts as well, as needed.

To assist with controlling the motors 712, 714 and controlling the location and speed of the actuator rod 722 (and, thus, the press ram and the tool attached to the press ram), the first motor 712 includes a first encoder 772 that identifies its rotational position and the second motor 714 includes a first encoder 774 that identifies its rotational position. By knowing the rotational positions of the drive shafts of their respective motors 712, 714, the first encoder 772 and the second encoder 774 can be used to determine the precise rotational velocity (in RPMS) of the motors 712, 714, as well as the precise velocity and location of the actuator rod 722 because the actuator screw 786 (FIGS. 13B-13C) in the actuator 720 has a known lead (e.g., 25 mm per revolution). Thus, when a known rotation is applied to the actuator screw 786 of the actuator 720 by the motors 712, 714 via the first and second actuator sprockets 731, 732, a corresponding linear movement (i.e., a known distance) for the actuator rod 722 over a period time is also known, which further yields the velocity of the actuator rod 722. The operation and functionality of the first encoder 772 and the second encoder 774 are described in more detail relative to FIG. 15.

In an alternative arrangement, the actuator 720 can be configured such that both the first motor 712 and the second motor 714 are coupled to intermediate sprockets on the same intermediate shaft via first and second belts. The intermediate shaft would include a drive sprocket that is directly coupled to a sprocket on the actuator 720. Thus, only a single belt is coupled to and drives the actuator 720.

FIG. 12 illustrates the actuator 720 of FIG. 11 within a four-post press 800. The actuator 720 is mounted to the stationary press crown 830 and the actuator rod 722 is mounted to the press ram 832. The press ram 832 moves under the power of the actuator rod 722 to and from the press base 834 based on the outputs of the first motor 712 and second motor 714, as described above relative to FIG. 11. The press ram 832 holds an upper tool 842 and the press base 834 holds a lower tool 844. A part is formed by the four-post press 800 between the upper tool 842 and lower tool 844. As shown, the upper tool 842 and lower tool 844 are for forming a curved sheet-metal part, but a variety of different forming, cutting, and punching tools can be applied to the press machine 800. The press machine 800 may include a brake to hold the position of the press ram 832 when the press machine 800 is powered down or at a steady state.

When the part is being formed during the low-speed, high-force stroke of the cycle, both of the first motor 712 and the second motor 714 are rotating as the low-speed, high-force first motor 712 provides power to the actuator 720 because there is no clutch or mechanism to disconnect the second motor 714 from the actuator 720. In other words, while the actuator 720 is being powered by the first motor 712, the second-motor belt 745 is still turning due to the rotation of the second actuator sprocket 732 (see FIGS. 11A and 11C), which causes the second motor 714 to rotate. As such, during the low-speed, high-force stroke of the cycle, the second motor 714 is preferably operational to provide torque (albeit a smaller amount of torque relative to the torque provided by the first motor 712) such that the torque of the high-speed, low-force second motor 714 is additive to the torque of the low-speed, high-force first motor 712.

Figure 11A:
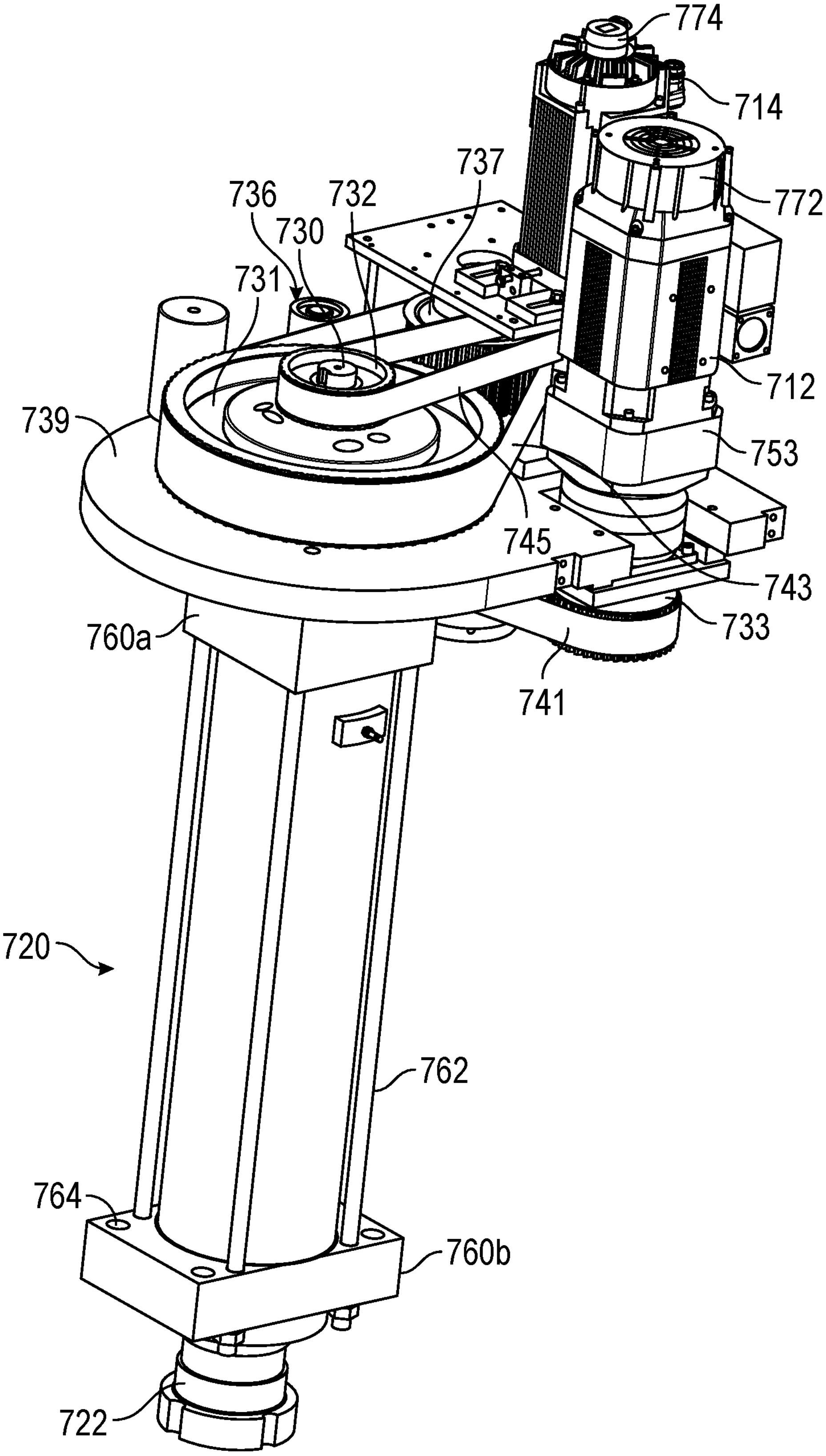
FIG. 11A is a perspective view of a further alternative linear actuator having two motors and a clutch system.
Figure 11B:
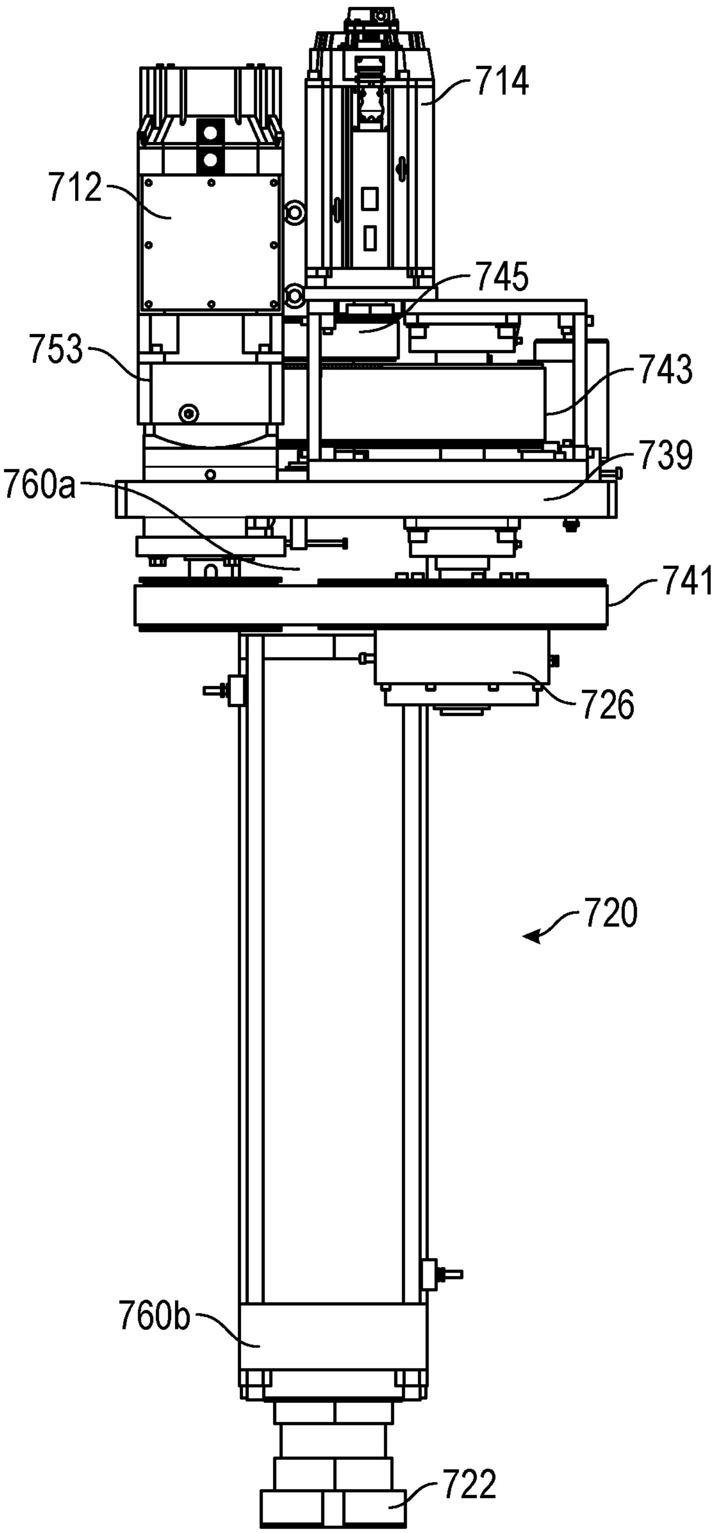
FIG. 11B is a side view of the alternative linear actuator of FIG. 11A.
Figure 11C:
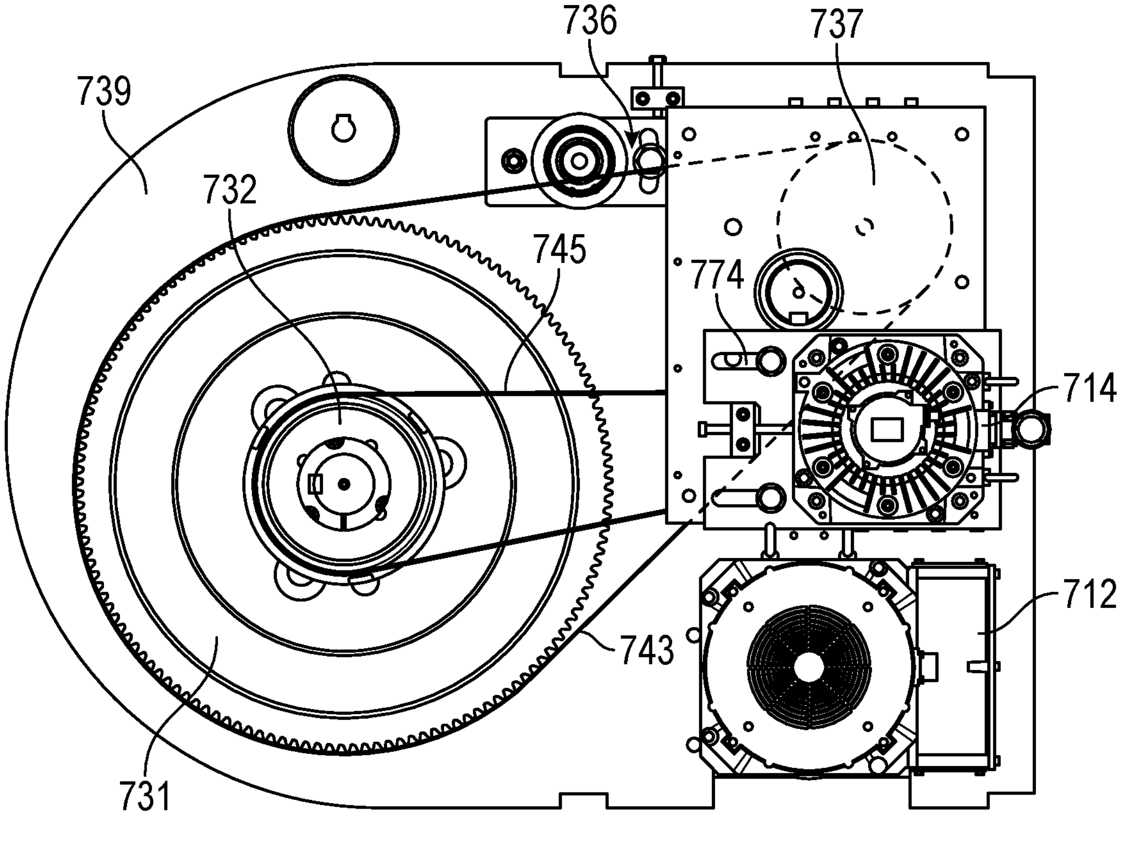
FIG. 11C is a top view of the alternative linear actuator of FIG. 11A.
Figure 11D:
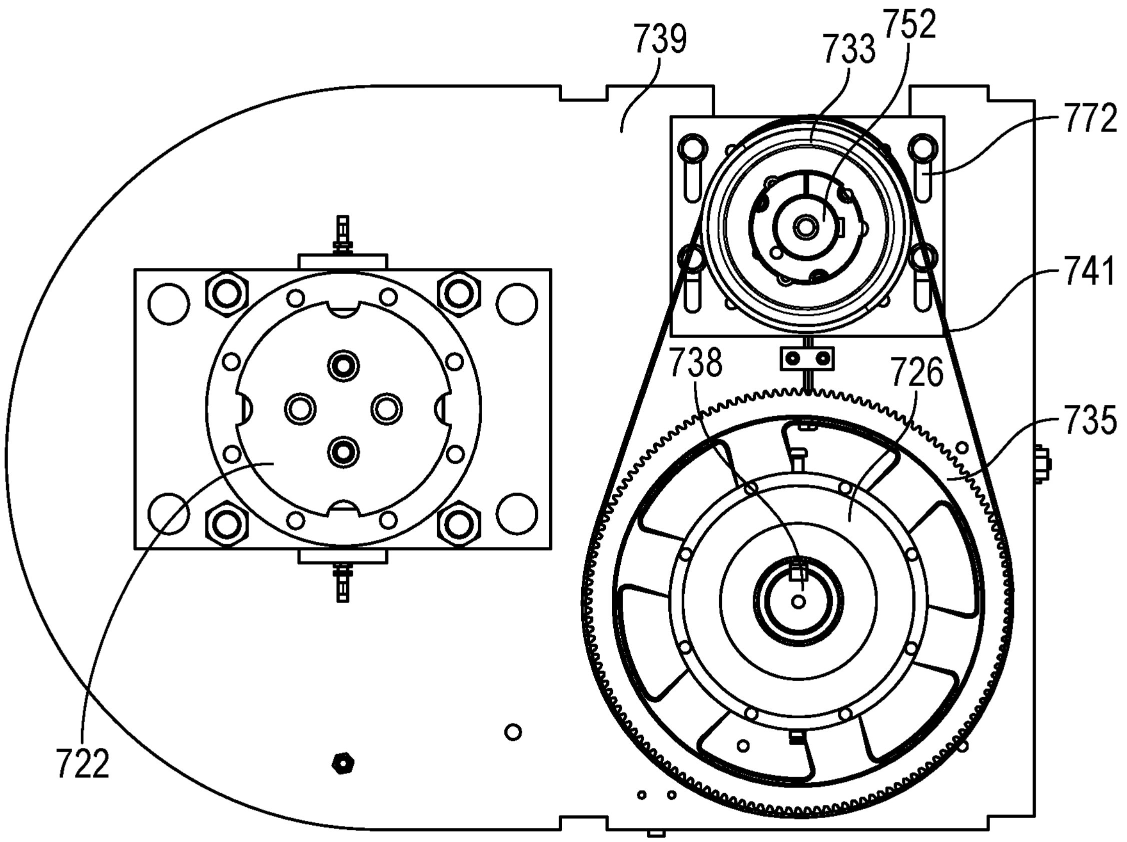
FIG. 11D is a bottom view of the alternative linear actuator of FIG. 11A.
Figure 12:
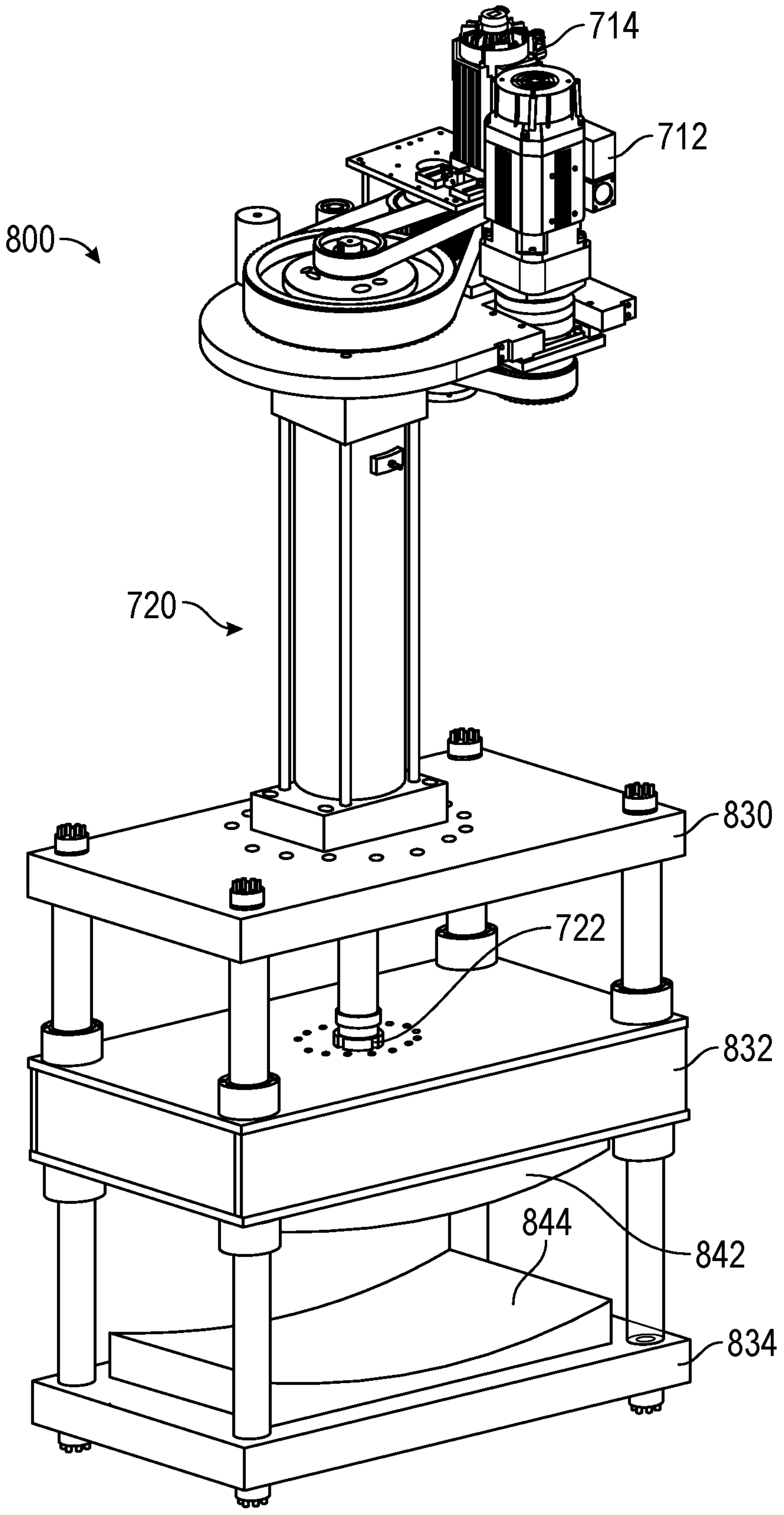
FIG. 12 is a perspective view of a four-post press machine that is driven by the linear actuator of FIG. 11.
Figure 13A:
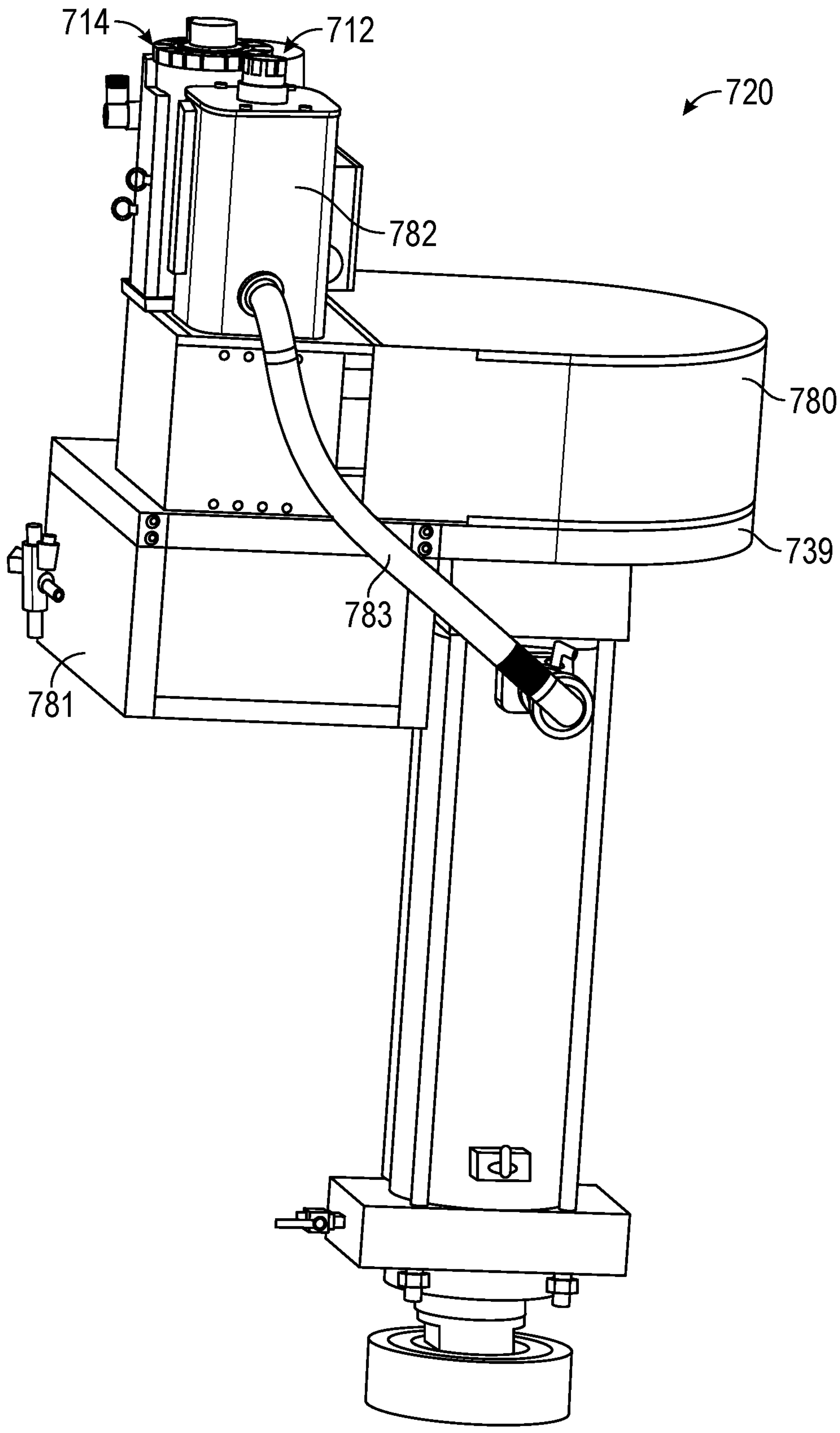
FIG. 13A illustrates the alternative linear actuator of FIG. 11 with the enclosures and the lubrication reservoir.
Figure 13B:
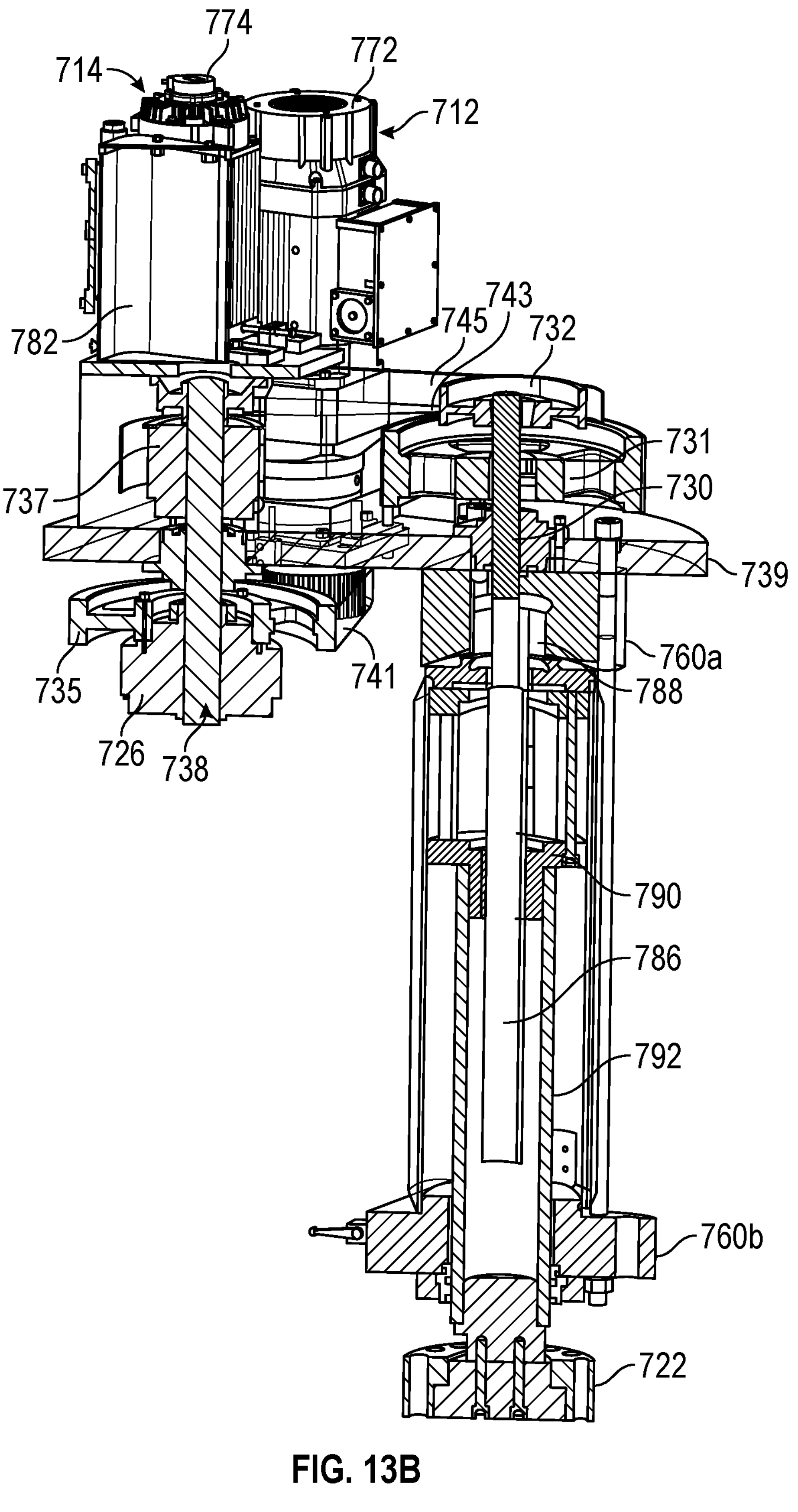
FIG. 13B illustrates the alternative linear actuator in a cross-sectional view.
Figure 13C:
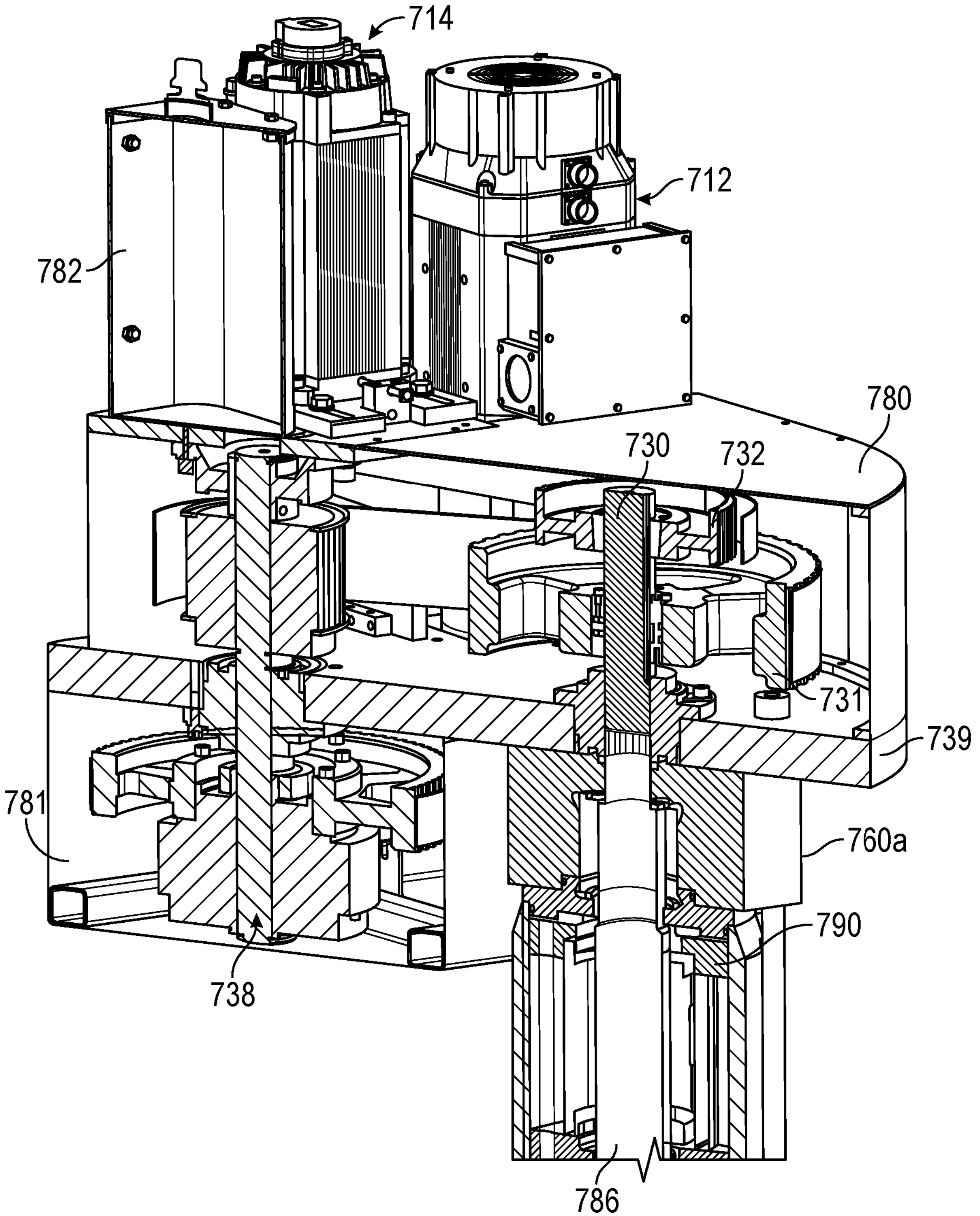
FIG. 13C illustrates the alternative linear actuator in an enlarged cross-sectional view.

FIGS. 13A-13C illustrate the actuator 720 and drive system from FIGS. 11-12 in more detail. In particular, FIG. 13A illustrates an upper enclosure 780 located above the platform 739 and a lower enclosure 781 below the platform 739 for protecting the various belts and sprockets. Additionally, a lubrication reservoir 782 is located above the upper enclosure 780 and fluidically communicates with the internal screw-and-nut mechanism of the actuator 720 via a fluid line 783. The details of lubricating function are described below.

FIG. 13B illustrates a cross-section through the screw-and-nut mechanism of the actuator 720 and other components with the system, including the intermediate shaft 738, the clutch 726, and the adjacent belts and sprockets. FIG. 13C illustrates an enlarged view of the cross-section of FIG. 13B with the upper enclosure 780 and the lower enclosure 781 also included in the view. The actuator input shaft 730 is coupled to the actuator screw 786, which rotates with the actuator input shaft 730 as it is driven by the first actuator sprocket 731 and/or the second actuator sprocket 732. The actuator screw 786 remains vertically stationary and is held by a thrust bearing 788. A second thrust bearing (not shown) may be at the lower end of the actuator screw 786.

As the actuator screw 786 rotates, a nut 790 with mating threads moves along the length of the actuator screw 786. The lead for the threads on the nut 790 and actuator screw 86 is preferably 25 mm per revolution. (i.e., about 1 inch per revolution). The nut 790 is attached to a shaft 792 that fits around the actuator screw 786 and forms part of the actuator rod 722 that moves up and down to drive the press ram and tool.

The lubrication from the lubrication reservoir 782 is used to maintain a proper amount of lubrication for the nut 790 and the actuator screw 786. The lubrication is fed into the region via the fluid line 783 (FIG. 13A) and remains around the nut 790 and actuator screw 786 by seals located near the top cap 760*a* and lower cap 760*b*. As the nut 790 moves downward, fluid may be pulled from the reservoir 782 and replace the void above the nut 790. As the nut 790 moves upward, the fluid can be forced though the line 783 back into the reservoir 782. The nut 790 may also have openings that allows the fluid to pass above and below the nut 790 as it moves. The reservoir 782 is designed to hold about 5 gallons of fluid lubrication. Instead of fluid, grease could be used as well.

The Table below shows the difference in velocity outputs of the actuator rod 722 (in inches-per-minute (IPM)) of the press when three different motor configurations are used for the first and second motors 712, 714, and when different gear/sprocket/belt configurations are used. In all three configurations, the press is designed to provide about 125 tons of force to form the part. The reference numerals for the belt/sprocket reduction associated with the belts 741, 743, 745 and the gear-box reduction associated with the gear box 753 are shown in parentheticals.

722. The larger motors and reduced gear reduction result in faster travel speeds for the actuator rod 722. This enhances production rates by reducing travel time of the actuator for a given press stroke.

As such, in one embodiment, the present invention contemplates a press with a single actuator configured that delivers in excess of 100 tons of force and has an actuator rod (and a press ram/tool) traveling at between 300-700 inches per minute during advancement and retraction. In another embodiment, when the actuator 720 of FIGS. 11-13 delivers in excess of 100 tons of force to the press ram and has a total reduction factor (via gears and sprockets/belts) for the first motor 712 between 10 and 50, and a total reduction factor (via gears and sprockets/belts) for the second motor 714 between 1 and 8. In another embodiment, the press delivers in excess of 100 tons of force, has an actuator rod (and a press ram/tool) traveling at between 300-700 inches per minute during advancement and retraction, has a total reduction factor (via gears and sprockets/belts) for the first motor 712 between 10 and 50, and a total reduction factor (via gears and sprockets/belts) for the second motor 714 between 1 and 8.

Like the actuator 320 from FIG. 7, the actuator 720 can be used in various types of press machines (e.g., gib-style presses) and other metal bending machines, such as press brake machines and metal bending machines, in which a high-forces (e.g. +100 tons) are required. Furthermore, like the actuator 320 from FIG. 7, the actuator 720 can be used in multiple actuator arrangements, such as those shown in FIGS. 9-10 and 14A-14B.

Figure 14A:
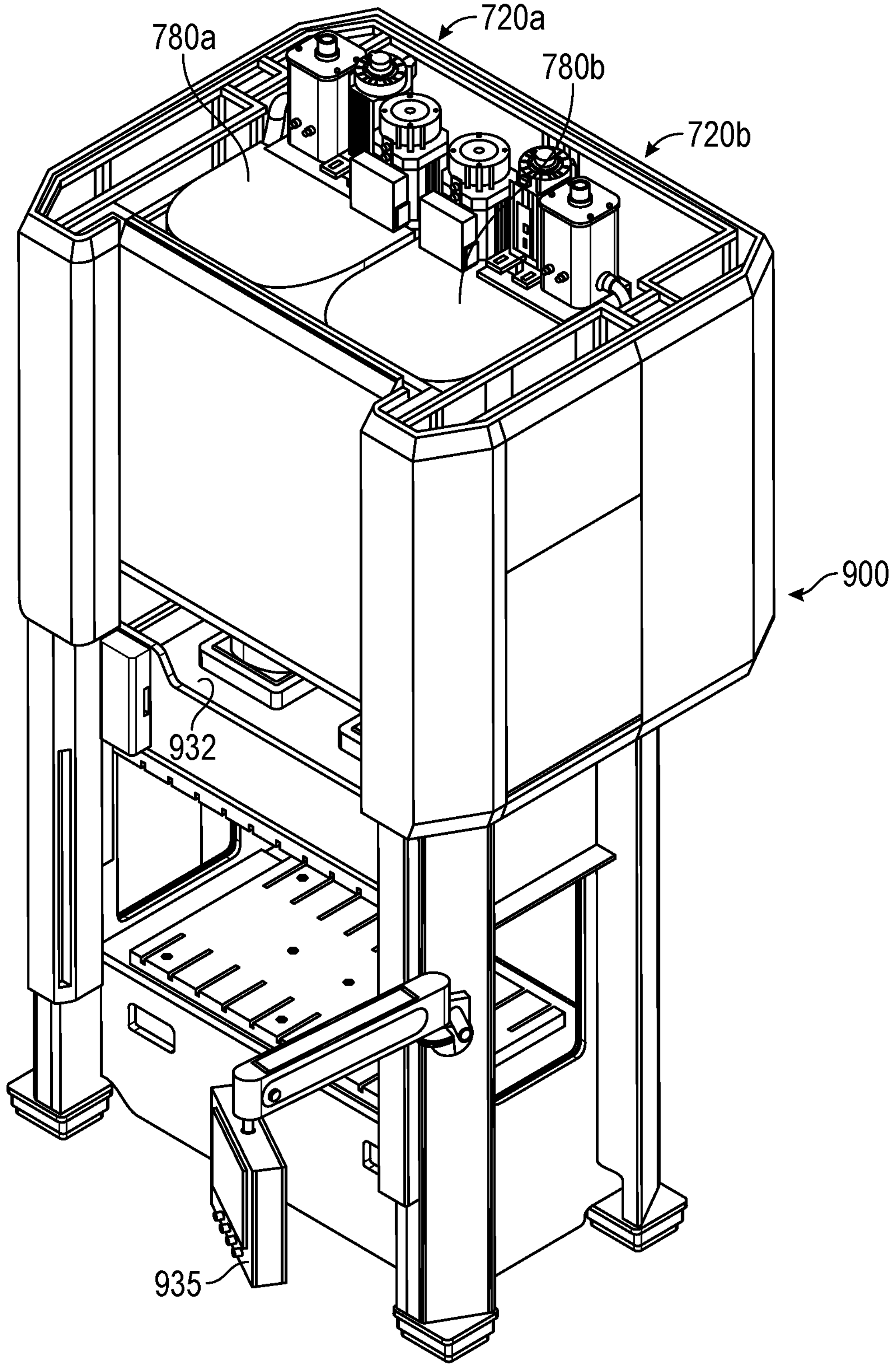
FIG. 14A illustrates a press using two linear actuators.
Figure 14B:
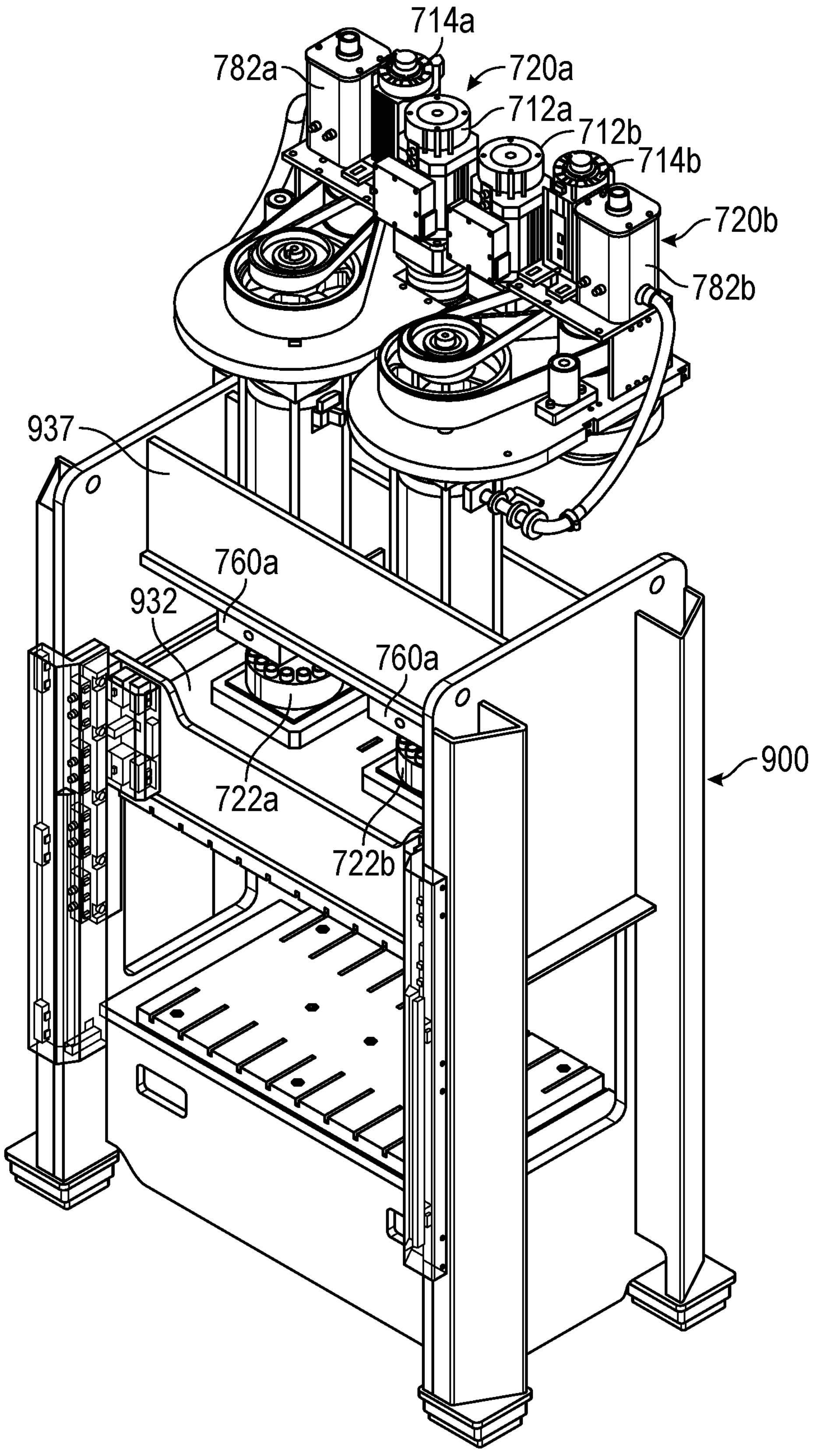
FIG. 14B illustrates the press of FIG. 14A with the parts of the press housing and the actuator enclosures removed.

FIGS. 14A and 14B illustrate a gib-style press 900 that can deliver in excess of 200 tons of force (e.g., 250 tons) to the press ram 932 using a pair of actuators 720*a* and 720*b*. FIG. 14A illustrates the various pieces of the housing of the press 900 and also the upper enclosures 780*a*, 780*b* that protects the drive systems for the actuators 720*a*, 720*b*. FIG. 14A also illustrates an input/output device 935 associated with the control system for the press 900. The input/output device 935 includes hard keys and/or touch keys allowing the operator to input parameters for operation of the press 900, and a display for displaying information about the operation and diagnostics of the press 900.

FIG. 14B illustrates the press 900 with the housing pieces removed and the upper enclosures 780*a*, 780*b* removed. The lower caps 760*a* are mounted to an intermediate press crown

| | Motor | Power | Gear Box Reduction | First Belt/Sprockets Reduction | Second Belt/Sprockets Reduction | Total Gear Box-Sprocket Reduction | Max Input RPM | Max Output RPM | Max IPM (#722) |
|---|---|---|---|---|---|---|---|---|---|
| Press 1 | #714 | 15 kw | None | 3.73 (#745) | None | 3.73 | 1500 | 402 | 395 |
| | #712 | 22 kw | 7 (#753) | 2.33 (#741) | 2.33 (#743) | 38.01 | 1800 | 47 | 46 |
| Press 2 | #714 | 22 kw | None | 3.11 (#745) | None | 3.11 | 1500 | 482 | 474 |
| | #712 | 37 kw | 7 (#753) | 2.24 (#741) | 1.50 (#743) | 23.52 | 1800 | 77 | 75 |
| Press 3 | #714 | 37 kw | None | 2.65 (#745) | None | 2.65 | 1500 | 567 | 558 |
| | #712 | 55 kw | 7 (#753) | 1.61 (#741) | 1.40 (#743) | 15.78 | 1800 | 114 | 112 |

From the table above, with the overall force being constant at about 125 tons for all three press configurations, the additional power provided by the first and second motors 712 and 714 in the Press 2 and Press 3 configurations is used to increase the velocity of the actuator rod 722, especially when advancing the tool toward the to-be-formed part or retracting the tool from the formed part. Consequently, the efficiency of the press increases because less time is needed during the advancement and retraction of the actuator rod structure 937 in the press 900, while the lower part of the actuator rods 722*a*, 722*b* are coupled to the press ram 932. The left actuator 720*a* is arranged in an opposite fashion compared to the right actuator 720*b*. Thus, the fluid reservoirs 782*a*, 782*b* are on the outside of the actuators 720*a*, 720*b*, while the first motors 712*a*, 712*b* are directly adjacent to each other. This is different from the embodiment of FIGS. 9A-9B in which the two actuators 320 have the same configuration, but are rotated 180 degrees from each other.

Figure 15:
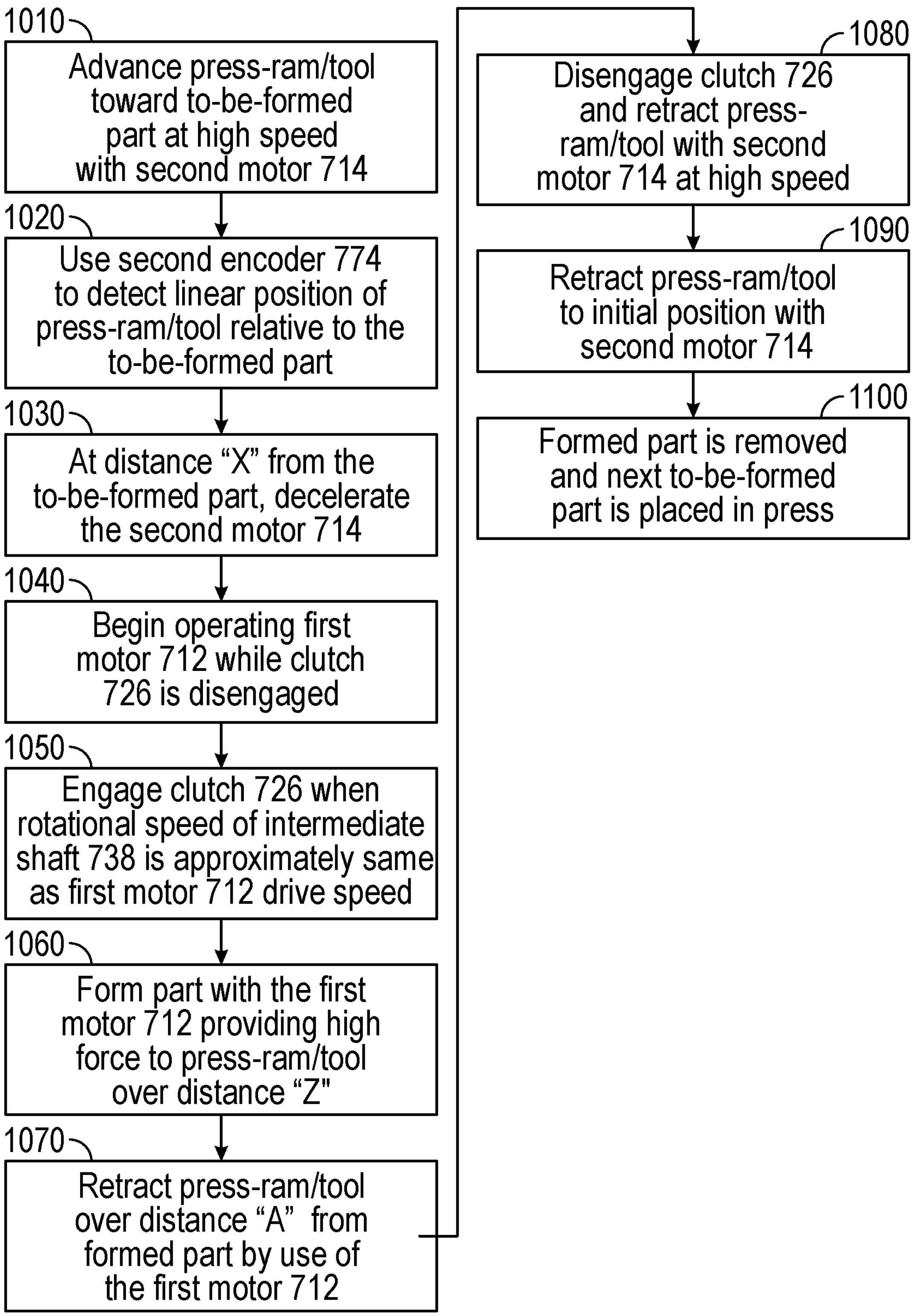
FIG. 15 is a flow chart of one operational mode for a press using the linear actuator.

FIG. 15 illustrates a flow diagram of the operation of the press by use of the first encoder 772 and the second encoder 774 (FIG. 11A). Based on information related to the to-be-formed part, the location of the to-be-formed part relative to the press ram (and the tool on the press ram) is known. During operation, the press ram/tool initially moves downwardly at a high rate of speed (e.g., 300-700 inches per minute) during the advancement stroke as it moves toward the part under the drive force of the second motor 714 (Step 1010). The second encoder 774 is used for detecting the linear position of the press ram/tool relative to the part by knowing the rotational positon of the second motor 714 (Step 1020). The first actuator sprocket 731 and the belt 743 associated with drive system of the first motor 712 are still being driven at a high rate of speed due by the second motor 714. During this high speed advancement, the clutch 726 is disengaged such that the belt 741 (FIG. 11D) is not driving the first motor 712.

In response to the press ram/tool being a known distance "X" from the to-be-formed part as detected by the second encoder 774, the second motor 714 decelerates from its high-speed condition (e.g., 400 inches per minute at the press ram/tool) to a speed that moves the press ram/tool at a linear speed that is associated with the operation of the first motor 712 (e.g., 75 inches per minute) (Step 1030). After or during this deceleration process of the second motor 714, the first motor 712 begins operation at a rotational velocity, as measured by the first encoder 772 that, but for the fact that the clutch 726 is disengaged, would normally result in a linear speed at the press-ram/tool (e.g., 75 inches per minute) that is used to form the part with high force (e.g. in excess of 100 tons or 200 tons) (Step 1040). When the rotational speed on the intermediate shaft 738 from both drive sources (i.e., as driven by the belt 743 and the second motor 714 via the first actuator sprocket 731; and as driven by belt 741 and the first motor 712) is approximately the same, the clutch 726 engages so that the first actuator sprocket 731 is now receiving high-torque from the first motor 712. (Step 1050). This results in a smooth transition to the high-torque condition. At this point, the press ram/tool is a known distance "Y" relative to the part, as measured by the second encoder 774, wherein "Y" is less than "X". The difference between "X" and "Y" relates to the amount of time it takes for the second motor 714 to decelerate from the high rate of speed to the rotational speed at which the first motor 712 is to operate. It should be noted again that, without a clutch 726 in the drive system associated with the first motor 712, the first motor 712 would be driven by the second motor 714 at a rate of speed (as dictated by the total reduction due to the pulleys and gear box) that would exceed the maximum rotational speed of the first motor and damage the first motor 712.

By use of the second encoder 774, the press ram/tool are and are further advanced by a known distance "Z" that is needed to fully form the part (Step 1060). When forming the part, the first motor 712 is providing the majority of the force, but the second motor 714 may still be operational to help provide a smaller amount of force. In this preferred embodiment, the second motor 714 delivers less than 10% of the overall force to the press ram/tool, such as between 5% and 10% (i.e., the first motor 712 delivers greater than 90%, such as between 90% and 95%). When the press ram/tool has advanced the full distance "Z" to form the part, the first motor 712 and the second motor 714 are reversed to starting retracting the press ram/tool from the now-formed part. It should be noted that the velocity of the press ram/tool during the forming process preferably decrease at some point along the distance "Z" so that the advancement velocity is low (preferably near 0 inches per minute) at distance "Z" so that another smooth transition may occur as the press ram/tool is retracted.

For at least some distance "A" during the retraction mode as measured by the first encoder 772 and/or the second encoder 772, the first motor 712 is preferably operational to ensure any contact-engagement force between the now-formed part and the tool is overcome by the high force provided by the first motor 712. (Step 1070). At a point at which the formed part is disengaged from the press-ram/tool, the clutch 726 is disengaged such that only the second motor 714 is driving the actuator 720. (Step 1080). The second motor 714 then accelerates to quickly retract the press-ram/tool from the now-formed part to its initial positon (Step 1090). When the clutch 726 is disengaged, the first motor 712 can move to a non-operational mode to reduce the power consumption of the system. Alternatively, the first motor 712 may continue to rotate as it waits for the next part to be formed.

When the second motor 714 retracts the press-ram/tool, the formed part can be removed from the press and a new to-be-formed part is placed in the press (Step 1100). The process then repeats itself and, thus, when the press ram/tool is the known distance "X" from the next to-be-formed part as detected by the second encoder 774, the second motor 714 decelerates to a rate of speed that moves the press ram/tool at a linear speed associated with the operation of the first motor 712. The first motor 712 begins operation and the clutch 726 engages to allow the first motor 712 to apply the high force to the part.

In this embodiment described relative to FIG. 15, the second encoder 774 associated with the second motor 714 is used for controlling the linear speed and location of the press-ram/tool, even when the first motor 712 is providing the high force condition and forming the part. On the other hand, the first encoder 772 is used to ensure that the first motor 712 is driving at the proper speed when the clutch 726 is engaged to provide a smooth transition when first motor 712 becomes operational to form the part. Because the second motor 714 is always rotating with the actuator shaft 730 (i.e., the second motor 714 is directly coupled to the actuator 720 via the belt 745), the second encoder 774 is used as the master encoder for the press machine. Further, because of the direct coupling of the actuator 720 and the second motor 714, there are less opportunities for tolerance issues in the drive system for the second motor 714 to cause errors in measuring the linear position (and, thus, the linear speed) of the actuator rod 720 via the second encoder 774.

Though the methodology for driving the press ram in FIG. 15 has been described using the second encoder 774 as the master sensor for determining the position (and, thus, the velocity of the press ram/tool), it should be understood that other sensors could be used as well. For example, a linear transducer or similar device may determine the position of the press ram directly from, the press ram, the actuator, or the actuator rod. Alternatively, an encoder could be used in conjunction with the screw or nut of the male-female connection within the actuator. Like the second encoder 774, all of these types of sensors provide a scalable digital output for determining the position of the press ram/tool. Further, these optional sensors would help to determine the rotational velocity of the shaft associated with the clutch 726 to dictate the rotational velocity that should be sensed by the first encoder 772 being the clutch 726 is engaged to ensure the drive speed at the actuator provided by the first motor 712 is approximately the same as the drive speed at the actuator provided by the second motor 714.

Figure 16:
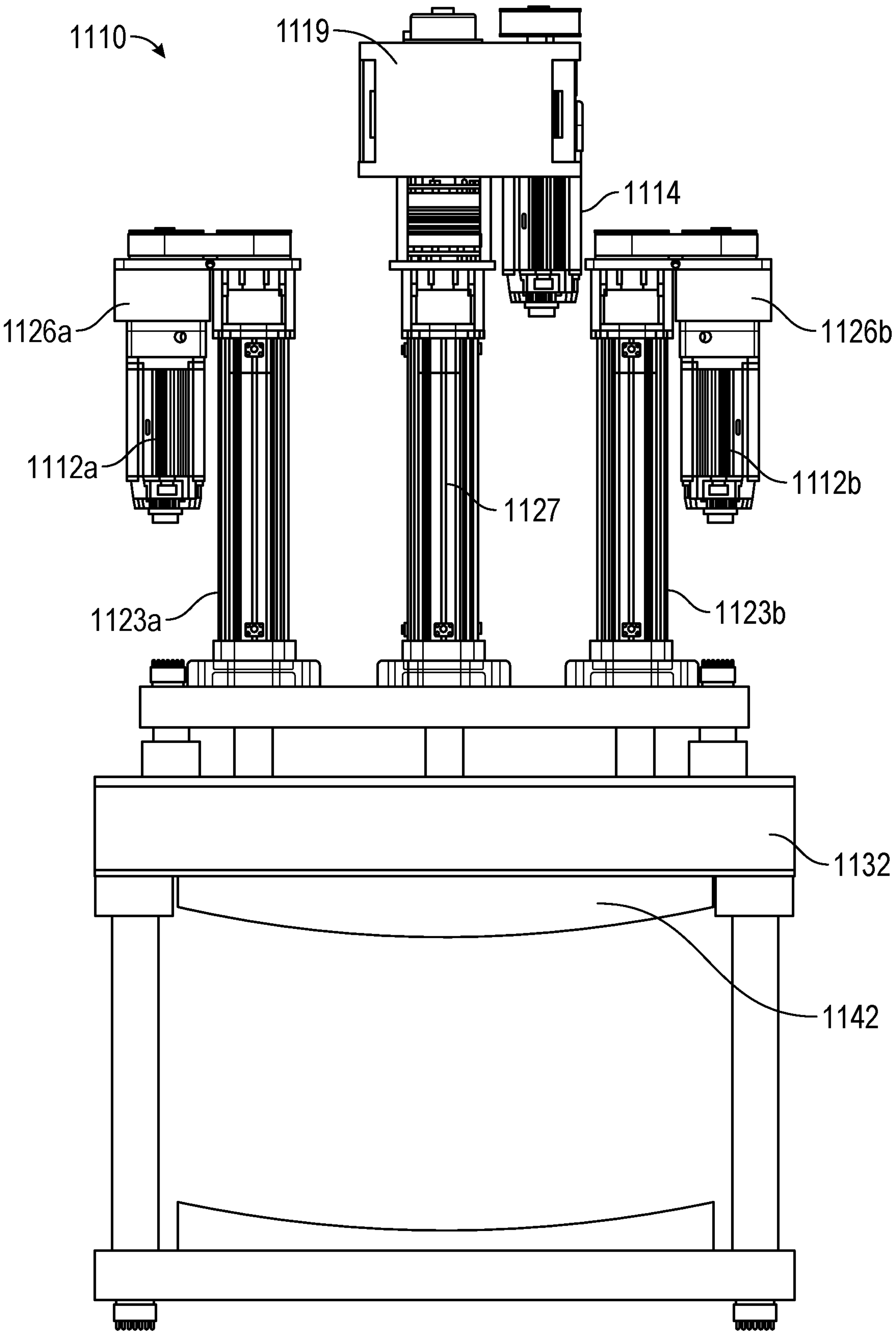
FIG. 16 illustrates an alternative linear actuated press system using three motors and three actuators, in which the two high-torque motors include clutch systems.

FIG. 16 illustrates an alternative linear actuated press system 1110 using three actuator arrangements, each of which has a motor and a linear actuator. A pair of first motors 1112*a*, 1112*b* provides the low-speed/high force conditions and a second motor 1114 provides the high-speed/low-force conditions. In the first actuator arrangements, the first motors 1112*a*, 1112*b* are driving first linear actuators 1123*a*, 1123*b* by use of belts and sprockets. The first linear actuators 1123*a*, 1123*b* have male-female thread mechanisms (e.g., threaded screw-nut engagement used in the prior embodiments) for forming the part with a press ram 1132 and an upper tool 1142. In the second actuator arrangement, the second motor 1114 drives a second linear actuator 1127 having the male-female thread mechanism of the prior embodiments, thereby providing the high-speed/low-force condition to the press ram 1132 and the upper tool 1142 when advancing and retracting the press ram 1132 relative to the part.

The second actuator 1127 is coupled to the second motor 1114 via a gear and/or sprocket system 1119, which is sized to provide enough force to advance the press ram 1132 upwardly and downwardly in a high-speed/low-force condition. In that high-speed/low-force condition, the pair of first motors 1112*a*, 1112*b* are still coupled to the press ram 1132 via the first linear actuators 1123*a*, 1123*b*, which are still operating at a high speed along with the press ram 1132. To minimize the potentially detrimental effects of the high-speed condition on the pair of first motors 1112*a*, 1112*b*, each of the first motors 1112*a*, 1112*b* includes a corresponding clutch 1126*a*, 1126*b* between the drive shaft of the first motors 1112*a*, 1112*b* and the drive shaft of the first linear actuators 1123*a*, 1123*b*. As shown in FIG. 16, the corresponding clutches 1126*a*, 1126*b* are coupled to the drive shaft of the first motors 1112*a*, 1112*b*, but they could also be placed on the shafts of the first linear actuators 1123*a*, 1123*b*.

When high force is required as the press ram 1132 and tool 1142 closely approach or engage the to-be-formed part, the clutches 1126*a*, 1126*b* can be engaged to provide the high-force conditions from the pair of first motors 1112*a*, 1112*b*. During the high-force condition of the press cycle, the second motor 1114 and the second actuator 1127 may optionally be active and contribute to the total force applied to the upper tool 1142 within the press ram 1132. Thus, the embodiment of FIG. 16 is a three-actuator system in which the clutches 1126 are used to reduce the speed at which the low-speed/high-force actuators 1123 drives the pair of first motors 1112 when the press ram 132 is moving quickly in the advancement or retraction mode due to the second motor 1114.

The alternative press system 1110 of FIG. 16 is advantageous when multiple high-force actuators are needed to provide a high press force output to the press ram 1132. For example, if the press system 1110 is required to generate in excess of 400 tons of force to the press ram 1132 to form the part, the press system 1110 can include four of the first motors 1112 (and four first actuators 1123) to produce at least 400 tons of force (each first motor 1112 delivering at least 100 tons). However, the press system 1110 would only need a single second motor 1114 and corresponding second actuator 1127 to provide the high-speed advancement and retraction of the press ram 1132 (i.e., five total motors for the press system 1110). If the mass of the press ram 1132 is high, then an additional second motor 1114 may be added to provide the high-speed advancement and retraction of the press ram 1132 (i.e., six total motors for the press system 1110). The clutches 1126 associated with the first motors 1112 limit the rotational speed of the first motors 1112 to acceptable RPMs despite the male-female threaded mechanism of the first linear actuators 1123 rotating at high RPMs during the high-speed advancement and retraction of the press ram 1132 caused by the second motor 1114.

In the press machines with the multi-speed linear actuators in accordance to the previous embodiments of FIGS. 1-16, the downward force can result in 75 tons, 100 tons, 125 tons, 150 tons, 175 tons, 200 tons or more than 200 tons of force on the part in the working stroke driven by the first motor(s). In one embodiment, the force provided by the linear actuators of the press machine is at least 50 tons, but preferably more than 100 tons. Press machine systems using multiple actuators (e.g., FIGS. 9 and 10) can deliver in excess 200 tons, 300 tons, 400 tons, or 500 tons by adding additional actuators with high-torque, low-speed motor systems. Further, the linear press machines will provide a linear velocity of the press ram (and upper tool) via the actuator typically in the range of 300 to 700 inches per minute in the advancement and retraction strokes driven by the second motor(s). In one embodiment, the velocity of the actuator is at least 250 inches per minute, is preferably greater than 400 inches per minute, is preferably greater than 500 inches per minute, and is most preferably greater than 750 inches per minute (such as 800 or 900 inches per minute) in the advancement and retraction strokes. In these embodiments, the linear velocity of the linear actuator and, hence, the press ram in the advancement stroke is: greater than about 4 times the linear velocity in the working stroke when the part is being formed, greater than about 5 times the linear velocity in the working stroke when the part is being formed, greater than about 6 times the linear velocity in the working stroke when the part is being formed, greater than about 7 times the linear velocity in the working stroke when the part is being formed, greater than about 8 times the linear velocity in the working stroke when the part is being formed, greater than about 9 times the linear velocity in the working stroke when the part is being formed, or greater than about 10 times the linear velocity in the working stroke when the part is being formed.

In the previous embodiments, the pulleys and belts can be interchanged with gears or other drive systems. Similarly, the sprockets and belts can be interchanged with gears or other drive systems.

As shown in the figures, the multi-speed linear actuators of the present invention are contemplated for use on the press machines in which the press ram slides along posts, such as a four-post press (all four posts can be seen, for example, in FIG. 8) or a two-post press. Furthermore, the present invention is also contemplated for use on the press machines in which the press ram moves along gibs (e.g., wedge-shaped gibs) in the frame that guide the reciprocating motion of the press ram, such as those shown in FIGS. 9 and 14.

In the embodiments above, the high-speed motor system causes the press ram to move at a high velocity during the advancement stroke toward the to-be-formed part, and/or the retraction stroke from the now-formed part. However, because the high-force motor system(s) that is needed to form the part is still coupled to the same press ram via the same actuator used by the high-speed motor system or a parallel actuator that is also coupled to the press ram, the high velocity of the press ram in the advancement and/or retraction stroke would cause the high-force motors (via the sprockets, belts, gears) to rotate at rotational speeds that exceed their limits and would damage them. The use of the clutches and specific locations within the high-force motor system(s) allow those motors to disengage and limit their rotational speeds in the advancement and/or retraction strokes.

These embodiments and obvious variations thereof is contemplated as falling within the spirit and scope of the claimed invention, which is set forth in the following claims. Moreover, the present concepts expressly include any and all combinations and subcombinations of the preceding elements and aspects.

We claim:

1. A press machine for forming a part, comprising:
- a moveable press ram for holding a tool that forms the part;
- an actuator for moving the moveable press ram by use of a male-female thread mechanism for producing a linear movement of the moveable press ram, the actuator including first and second actuator sprockets coupled to the male-female thread mechanism;
- a first motor drive system for producing a low-speed high-force linear movement to the moveable press ram via the actuator, the first motor drive system including a first motor for driving a first motor sprocket, a clutch, a first belt system coupling the first motor sprocket to the first actuator sprocket;
- a second motor drive system for producing a high-speed low-force linear movement to the moveable press ram via the actuator, the second motor drive system including a second motor for driving a second motor sprocket and a second belt system coupling the second motor sprocket to the second actuator sprocket; and
- a lubrication reservoir having fluid for providing lubrication to the male-female thread mechanism of the actuator via a fluid line;
- wherein, in response to the high-speed low-force linear movement of the second motor drive system to advance the press ram relative to the part, the fluid flows, via the fluid line, from the lubrication reservoir to a region around the male-female thread mechanism;
- wherein, in response to the high-speed low-force linear movement of the second motor drive system to retract the press ram relative to the part, the fluid flows, via fluid line, from the region around the male-female thread mechanism to the lubrication reservoir.

2. The press machine of claim 1, wherein, in response to the high-speed low-force linear movement of the second motor drive system to advance or retract the press ram relative to the part, the clutch at least partially disengages the first motor to maintain a rotational speed of the first motor below a limit to reduce possible damage to the first motor.

3. The press machine of claim 2, wherein, in response to the low-speed high-force linear movement of the first motor system to form the part, the clutch is operationally engaged to transfer torque from the first motor to the first actuator sprocket of the linear actuator via the first and second belt systems.

4. The press machine of claim 1, wherein the male-female thread mechanism includes a rotatable screw that remains linearly stationary and a nut that translates vertically along the rotatable screw.

5. The press machine of claim 4, wherein the nut includes a plurality of openings, the plurality of openings being configured to allow the fluid to pass through the nut in response to the high-speed low-force linear movement of the second motor drive system to advance or retract the press ram relative to the part.

6. The press machine of claim 1, wherein the fluid is grease.

7. The press machine of claim 1, wherein the linear velocity for the press ram is at least about 500 inches per minute when advancing the press ram toward the to-be-formed party by use of the second motor drive system.

8. The press machine of claim 7, wherein the low-speed high-force linear movement of the first motor drive system provides at least 100 tons of force to the part.

9. The press machine of claim 1, wherein the male-female thread mechanism includes a screw and a nut, the nut includes a plurality of openings configured to allow the fluid to pass through the nut in response to the high-speed low-force linear movement of the second motor drive system to advance or retract the press ram relative to the part.

10. The press machine of claim 1, wherein the lubrication reservoir is located away from the male-female thread mechanism.

11. The press machine of claim 10, wherein the lubrication reservoir is above the male-female thread mechanism and adjacent to at least one of the first motor drive system and the second motor drive system.

12. A press machine for forming a part, comprising:
- a moveable press ram for holding a tool that forms the part;
- an actuator for moving the moveable press ram by use of an actuator rod that is coupled to a male-female thread mechanism, the actuator for producing a linear movement of the moveable press ram, the male-female thread mechanism being within an enclosure that is partially defined by a top cap and a bottom cap, a portion of the actuator rod passing through the bottom cap, the bottom cap including a seal for sealing the enclosure;
- a first motor drive system for producing a low-speed high-force linear movement to the moveable press ram via the actuator, the first motor drive system including a first motor for driving a first motor sprocket, a clutch, a first belt system coupling the first motor sprocket to the actuator;
- a second motor drive system for producing a high-speed low-force linear movement to the moveable press ram via the actuator, the second motor drive system including a second motor for driving a second motor sprocket and a second belt system coupling the second motor sprocket to the actuator; and
- a lubrication reservoir having fluid for providing lubrication to the enclosure around the male-female thread mechanism;
- wherein, while the high-speed low-force linear movement of the second motor drive system is advancing and retracting the press ram relative to the part, the fluid flows between the lubrication reservoir and the enclosure around the male-female thread mechanism.

13. The press machine of claim 12, further including a platform located above the actuator, and wherein the first motor, the second motor, and the lubrication reservoir are mounted to the platform.

14. The press machine of claim 12, where the top cap includes a seal, the seal of the tap cap aiding in sealing the fluid within the enclosure.

15. The press machine of claim 12, further including a fluid line, the fluid flowing from the lubrication reservoir to the enclosure via the fluid line.

16. The press machine of claim 12, wherein the male-female thread mechanism includes a rotatable screw that remains linearly stationary and a nut that translates vertically along the rotatable screw.

17. The press machine of claim 16, wherein the nut includes a plurality of openings, the plurality of openings being configured to allow the fluid to pass through the nut in response to the high-speed low-force linear movement of the second motor drive system to advance or retract the press ram relative to the part.

18. The press machine of claim 12, wherein the male-female thread mechanism includes a screw and a nut, the nut includes a plurality of openings configured to allow the fluid to pass through the nut in response to the high-speed low-force linear movement of the second motor drive system to advance or retract the press ram relative to the part.

19. The press machine of claim 12, wherein the lubrication reservoir is located away from the male-female thread mechanism.

20. The press machine of claim 19, wherein the lubrication reservoir is above the male-female thread mechanism and adjacent to at least one of the first motor drive system and the second motor drive system.

* * * * *